US012593131B2

(12) United States Patent (10) Patent No.: US 12,593,131 B2
Kommareddy et al. (45) Date of Patent: Mar. 31, 2026

(54) VELOCITY MATCHING IMAGING OF A TARGET ELEMENT

(71) Applicants:General Electric Company, Schenectady, NY (US); Oliver Crispin Robotics Limited, Altrincham (GB)

(72) Inventors: Vamshi Krishna Reddy Kommareddy, Bangalore (IN); Andrew Crispin Graham, Badminton (GB)

(73) Assignees: General Electric Company, Evendale, OH (US); Oliver Crispin Robotics Limited, Cheshire (GB)

( * ) Notice: Subject to any disclaimer, the term of this patent is extended or adjusted under 35 U.S.C. 154(b) by 2 days.

(21) Appl. No.: 18/514,791

(22) Filed: Nov. 20, 2023

(65) Prior Publication Data

US 2025/0080852 A1 Mar. 6, 2025

(30) Foreign Application Priority Data

Sep. 5, 2023 (IN) .............................. 202311059598

(51) Int. Cl.
*H04N 23/695* (2023.01)
*H04N 23/50* (2023.01)
(52) U.S. Cl.
CPC ......... *H04N 23/695* (2023.01); *H04N 23/555* (2023.01)
(58) Field of Classification Search
CPC ........................... H04N 23/695; H04N 23/555
See application file for complete search history.

(56) References Cited

U.S. PATENT DOCUMENTS

| | | | |
|---|---|---|---|
| 5,610,994 | A | 3/1997 | Stadtfeld |
| 6,665,441 | B1 | 12/2003 | Nishio |
| 6,700,668 | B2 | 3/2004 | Mundy |
| 6,901,160 | B2 | 5/2005 | Chapman |
| 6,987,876 | B2 | 1/2006 | Silber |

(Continued)

FOREIGN PATENT DOCUMENTS

| | | |
|---|---|---|
| CA | 2362712 | 8/2000 |
| CN | 102944928 | 2/2013 |

(Continued)

OTHER PUBLICATIONS

USPTO; U.S. Appl. No. 18/141,493; Application filed May 1, 2023, entitled "Pulse Illumination Imaging of a Target Element".

(Continued)

*Primary Examiner* — Nasim N Nirjhar
(74) *Attorney, Agent, or Firm* — Fitch, Even, Tabin & Flannery LLP

(57) ABSTRACT

A system may include an image sensor. A system may include an actuator configured to cause a controlled movement of the image sensor relative to a target element, the controlled movement being based on an operating velocity of the target element relative to an initial position of the image sensor. A system may include a controller communicatively coupled to the image sensor, the controller configured to: identify the operating velocity, determine an activation time to activate the image sensor for a designated exposure time based on the operating velocity and the controlled movement; and activate the image sensor at the activation time.

18 Claims, 11 Drawing Sheets

(56) References Cited

U.S. PATENT DOCUMENTS

| | | | |
|---|---|---|---|
| 7,427,262 | B2 | 9/2008 | Bonningue |
| 7,543,518 | B2 | 6/2009 | Buckingham |
| 7,564,626 | B2 | 7/2009 | Bendall |
| 8,069,747 | B2 | 12/2011 | Buckingham |
| 8,144,411 | B2 | 3/2012 | Yazdanfar |
| 8,194,948 | B2 | 6/2012 | Hori |
| 8,200,042 | B2 | 6/2012 | Doi |
| 8,238,642 | B2 | 8/2012 | Wu |
| 8,248,465 | B2 | 8/2012 | Doi |
| 8,285,362 | B2 | 10/2012 | Dietz |
| 8,480,563 | B2 | 7/2013 | Nakano |
| 8,493,558 | B2 | 7/2013 | Asada |
| 8,504,321 | B2 | 8/2013 | Seidel |
| 8,558,879 | B2 | 10/2013 | Doi |
| 8,562,516 | B2 | 10/2013 | Saadat |
| 8,602,722 | B2 | 12/2013 | George |
| 8,737,756 | B2 | 5/2014 | Daneshpanah |
| 8,768,046 | B2 | 7/2014 | Ernst |
| 8,913,110 | B2 | 12/2014 | Hori |
| 8,965,103 | B2 | 2/2015 | Hori |
| 9,036,142 | B2 | 5/2015 | Ahner |
| 9,046,496 | B2 | 6/2015 | Tsai |
| 9,251,582 | B2 | 2/2016 | Lim |
| 9,271,637 | B2 | 3/2016 | Farr |
| 9,275,473 | B2 | 3/2016 | Hori |
| 9,300,926 | B2 | 3/2016 | Kell |
| 9,392,230 | B2 | 7/2016 | Yokota |
| 9,412,189 | B2 | 8/2016 | Bendall |
| 9,478,393 | B2 | 10/2016 | Potocek |
| 9,652,839 | B2 | 5/2017 | Newman |
| 9,721,326 | B2 | 8/2017 | Michel |
| 9,939,386 | B2 | 4/2018 | Lewis |
| 9,984,474 | B2 | 5/2018 | Bendall |
| 10,074,169 | B2 | 9/2018 | Niedermeier |
| 10,091,432 | B2 | 10/2018 | Mukunashi |
| 10,104,313 | B2 | 10/2018 | Slavens |
| 10,126,117 | B1 | 11/2018 | Byers |
| 10,147,176 | B1 | 12/2018 | Sones |
| 10,255,519 | B2 | 4/2019 | Nagatomo |
| 10,290,113 | B2 | 5/2019 | Akagi |
| 10,488,348 | B2 | 11/2019 | Romanovsky |
| 10,504,220 | B2 | 12/2019 | Lim |
| 10,536,617 | B2 | 1/2020 | Liang |
| 10,564,111 | B2 | 2/2020 | Safai |
| 10,636,148 | B1 | 4/2020 | Chen |
| 10,699,149 | B2 | 6/2020 | Bendall |
| 10,740,913 | B2 | 8/2020 | Shi |
| 10,742,958 | B2 | 8/2020 | Yamamoto |
| 10,775,315 | B2 | 9/2020 | Mekala |
| 10,835,102 | B2 | 11/2020 | Ganapati |
| 10,909,702 | B2 | 2/2021 | Ono |
| 11,022,560 | B2 | 6/2021 | Kato |
| 11,042,017 | B2 | 6/2021 | Doi |
| 11,084,169 | B2 | 8/2021 | Graham |
| 11,116,050 | B1 | 9/2021 | Bhogal |
| 11,258,952 | B2 | 2/2022 | Kaufmann |
| 11,288,789 | B1 | 3/2022 | Chen |
| 11,410,298 | B2 | 8/2022 | Finn |
| 11,486,251 | B2 | 11/2022 | Lopez |
| 11,538,257 | B2 | 12/2022 | Rozploch |
| 11,994,476 | B2 | 5/2024 | Li |
| 2001/0030744 | A1 | 10/2001 | Chang |
| 2002/0009218 | A1 | 1/2002 | Chapman |
| 2003/0234941 | A1 | 12/2003 | Mundy |
| 2005/0026710 | A1 | 2/2005 | Pao |
| 2005/0234296 | A1 | 10/2005 | Saadat |
| 2005/0288555 | A1 | 12/2005 | Binmoeller |
| 2006/0033908 | A1* | 2/2006 | Draggie .............. G02B 23/2476 |
| | | | 356/241.4 |
| 2006/0183977 | A1 | 8/2006 | Ishigami |
| 2007/0263904 | A1 | 11/2007 | Muramatsu |
| 2008/0240491 | A1 | 10/2008 | Hori |
| 2009/0092278 | A1 | 4/2009 | Doi |
| 2009/0167847 | A1 | 7/2009 | Doi |
| 2010/0128115 | A1 | 5/2010 | Nakano |
| 2010/0158362 | A1 | 6/2010 | Lang |
| 2011/0018987 | A1 | 1/2011 | Doi |
| 2011/0221877 | A1 | 9/2011 | Hori |
| 2012/0019653 | A1 | 1/2012 | Hori |
| 2013/0033607 | A1 | 2/2013 | Ohta |
| 2013/0093866 | A1 | 4/2013 | Ohlhues |
| 2013/0135457 | A1 | 5/2013 | Kell |
| 2013/0314530 | A1 | 11/2013 | Peterson |
| 2014/0002630 | A1 | 1/2014 | Yokota |
| 2014/0098091 | A1 | 4/2014 | Hori |
| 2014/0133697 | A1 | 5/2014 | Singamsetti |
| 2014/0163717 | A1 | 6/2014 | Das |
| 2014/0207419 | A1 | 7/2014 | Messinger |
| 2015/0168263 | A1 | 6/2015 | Mueller |
| 2015/0317816 | A1 | 11/2015 | Bendall |
| 2016/0073855 | A1 | 3/2016 | Farr |
| 2016/0221262 | A1 | 8/2016 | Das |
| 2016/0284084 | A1 | 9/2016 | Gurcan |
| 2016/0284103 | A1 | 9/2016 | Huang |
| 2017/0155832 | A1 | 6/2017 | Oshima |
| 2017/0156600 | A1 | 6/2017 | Ntziachristos |
| 2017/0318205 | A1 | 11/2017 | Duckett, III |
| 2018/0003161 | A1 | 1/2018 | Michini |
| 2018/0013959 | A1 | 1/2018 | Slavens |
| 2018/0103246 | A1 | 4/2018 | Yamamoto |
| 2018/0176470 | A1 | 6/2018 | Kim |
| 2018/0180534 | A1 | 6/2018 | Noda |
| 2019/0220968 | A1 | 7/2019 | Kato |
| 2019/0228514 | A1 | 7/2019 | Hestand |
| 2019/0260863 | A1* | 8/2019 | Kinouchi ............ H04M 1/0272 |
| 2019/0279380 | A1 | 9/2019 | Bendall |
| 2019/0285980 | A1 | 9/2019 | Yoshikawa |
| 2019/0328217 | A1 | 10/2019 | Moreau |
| 2019/0330997 | A1 | 10/2019 | Norton |
| 2019/0338666 | A1 | 11/2019 | Finn |
| 2019/0339165 | A1 | 11/2019 | Finn |
| 2019/0340805 | A1 | 11/2019 | Xiong |
| 2020/0056501 | A1 | 2/2020 | Eastment |
| 2020/0082526 | A1 | 3/2020 | Murphy |
| 2020/0213563 | A1 | 7/2020 | Morice |
| 2020/0319119 | A1 | 10/2020 | Peters |
| 2020/0346310 | A1 | 11/2020 | Huttner |
| 2021/0132598 | A1 | 5/2021 | Schleif |
| 2021/0239891 | A1 | 8/2021 | Moore |
| 2021/0281748 | A1 | 9/2021 | Nogami |
| 2021/0312702 | A1 | 10/2021 | Holzer |
| 2021/0396683 | A1 | 12/2021 | Zhang |
| 2022/0051395 | A1 | 2/2022 | Vandam |
| 2022/0061638 | A1 | 3/2022 | Hinding |
| 2022/0141368 | A1 | 5/2022 | Herman |
| 2022/0299645 | A1 | 9/2022 | Mitchell |
| 2022/0314430 | A1 | 10/2022 | Graham |
| 2023/0000328 | A1 | 1/2023 | Govrin |
| 2023/0016982 | A1 | 1/2023 | Graham |
| 2023/0018458 | A1 | 1/2023 | Graham |
| 2023/0018554 | A1 | 1/2023 | Graham |
| 2023/0334644 | A1 | 10/2023 | Ojima |
| 2024/0114237 | A1 | 4/2024 | Haist |
| 2024/0159711 | A1 | 5/2024 | Kommareddy |
| 2024/0163537 | A1 | 5/2024 | Kommareddy |
| 2024/0252268 | A1* | 8/2024 | Loschak ................ A61B 34/37 |

FOREIGN PATENT DOCUMENTS

| | | |
|---|---|---|
| CN | 104469177 | 3/2015 |
| CN | 106416225 | 2/2017 |
| CN | 106934794 | 7/2017 |
| CN | 107367899 | 11/2017 |
| CN | 108775998 | 11/2018 |
| CN | 110726633 | 1/2020 |
| CN | 111433574 | 7/2020 |
| CN | 112136154 | 12/2020 |
| CN | 112150382 | 12/2020 |
| CN | 214306123 U | 9/2021 |
| CN | 214368947 | 10/2021 |
| CN | 214965296 | 12/2021 |
| CN | 114810508 | 7/2022 |
| CN | 114979427 | 8/2022 |
| DE | 2439971 | 3/1976 |

(56)             References Cited

FOREIGN PATENT DOCUMENTS

| EP | 2170565 |    | 4/2010 |
|----|---------|----|--------|
| EP | 3643451 |    | 4/2020 |
| EP | 3643452 |    | 4/2020 |
| FR | 2965388 | B1 | 10/2012 |
| JP | 2008014656 |  | 1/2008 |
| JP | 2009168499 | A | 7/2009 |
| JP | 2009282379 | A | 12/2009 |
| JP | 2010008394 | A | 1/2010 |
| JP | 2011161019 | A | 8/2011 |
| JP | 5186314 | B2 | 4/2013 |
| JP | 2013059664 |  | 4/2013 |
| JP | 5307407 | B2 | 10/2013 |
| JP | 5361246 | B2 | 12/2013 |
| JP | 5390011 |  | 1/2014 |
| JP | 5602449 | B2 | 10/2014 |
| JP | 2017040932 | A | 2/2017 |
| JP | 6373322 | B2 | 8/2018 |
| JP | 6810711 |  | 1/2021 |
| KR | 101164656 |  | 7/2012 |
| WO | 9807001 |  | 2/1998 |
| WO | 2009144729 |  | 12/2009 |
| WO | 2019008342 |  | 1/2019 |
| WO | 2020110576 |  | 6/2020 |
| WO | 2020219076 |  | 10/2020 |
| WO | 2021094534 |  | 5/2021 |

OTHER PUBLICATIONS

Jason Geng: "Structured-light 3D surface imaging: a tutorial", Advances in Optics and Photonics, vol. 3, No. 2, Mar. 31, 2011 (Mar. 31, 2011), p. 128-160, XP055033088, DOI: 10.1364/AOP.3.000128.

Lim Ser Nam et al: "Automatic Registration of Smooth Object Image to 3D CAD Model for Industrial Inspection Applications", 2013 International Conference on 3D Vision, IEEE, Jun. 29, 2013 (Jun. 29, 2013), pp. 79-86, XP032480418, DOI: 10.1109/3DV.2013.19.

USPTO; U.S. Appl. No. 17/985,459; Application filed Nov. 11, 2022, entitled "Inspection Systems and Methods Employing Directional Light For Enhanced Imaging".

USPTO; U.S. Appl. No. 17/985,501; Application filed Nov. 11, 2022, entitled "Inspection Systems and Methods Employing Different Wavelength Directional Light For Enhanced Imaging".

USPTO; U.S. Appl. No. 17/373,917; Final Rejection mailed Feb. 14, 2025; (pp. 1-23).

USPTO; U.S. Appl. No. 17/373,917; Final Rejection mailed Apr. 16, 2024; (pp. 1-22).

USPTO; U.S. Appl. No. 17/373,917; Non-Final Rejection mailed Aug. 1, 2024; (pp. 1-25).

USPTO; U.S. Appl. No. 17/373,917; Non-Final Rejection mailed Nov. 16, 2023; (pp. 1-16).

USPTO; U.S. Appl. No. 17/373,920; Final Rejection mailed Feb. 12, 2024; (pp. 1-20).

USPTO; U.S. Appl. No. 17/373,920; Final Rejection mailed Nov. 4, 2024; (pp. 1-24).

USPTO; U.S. Appl. No. 17/373,920; Non-Final Rejection mailed Feb. 11, 2025; (pp. 1-26).

USPTO; U.S. Appl. No. 17/373,920; Non-Final Rejection mailed Jun. 7, 2024; (pp. 1-20).

USPTO; U.S. Appl. No. 17/373,920; Non-Final Rejection mailed Sep. 28, 2023; (pp. 1-17).

USPTO; U.S. Appl. No. 17/373,925; Final Rejection mailed Feb. 11, 2025; (pp. 1-15).

USPTO; U.S. Appl. No. 17/373,925; Final Rejection mailed Mar. 25, 2024; (pp. 1-14).

USPTO; U.S. Appl. No. 17/373,925; Non-Final Rejection mailed Aug. 26, 2024; (pp. 1-17).

USPTO; U.S. Appl. No. 17/373,925; Non-Final Rejection mailed Nov. 14, 2023; (pp. 1-12).

USPTO; U.S. Appl. No. 17/985,459; Final Rejection mailed Jan. 15, 2025; (pp. 1-17).

USPTO; U.S. Appl. No. 17/985,459; Non-Final Rejection mailed Mar. 27, 2025; (pp. 1-17).

USPTO; U.S. Appl. No. 17/985,459; Non-Final Rejection mailed Sep. 20, 2024; (pp. 1-22).

Waygate Technologies Brochure: Everest Mentor Visual iQ+ VideoProbe; 12 pgs.; Oct. 2024; (extension://efaidnbmnn-nibpcajpcglclefindmkaj/https://dam.bakerhughes.com/m/206c48e427981e2f/original/BHCS33632B-Mentor-ViQ-Brochure_R8-pdf.pdf).

Waygate Technologies, Everest Mentor Visual iQ+ VideoProbe product specification, Jan. 2024, 12 pp.

USPTO; U.S. Appl. No. 18/141,493; Notice of Allowance and Fees Due (PTOL-85) mailed Sep. 2, 2025; (pp. 1-11).

USPTO; U.S. Appl. No. 18/141,493; Notice of Allowance and Fees Due (PTOL-85) mailed Sep. 10, 2025; (pp. 1-4).

* cited by examiner

VELOCITY MATCHING IMAGING OF A TARGET ELEMENT

CROSS REFERENCE TO RELATED APPLICATIONS

This application claims priority to Indian Provisional Application No. 202311059598 filed Sep. 5, 2023, which is incorporated herein by reference in its entirety.

TECHNICAL FIELD

These teachings relate generally to motion imaging and more particularly to velocity matching imaging of a target element.

BACKGROUND

Visual artifacts are anomalies apparent in visual representations such as photographs. Motion blur is an artifact that results when the image being recorded moves during the recording of a single exposure. Capturing fast moving objects with a rolling shutter camera can further introduce wobble, skew, spatial aliasing, and temporal aliasing, reducing the overall clarity and accuracy of the captured images.

BRIEF DESCRIPTION OF DRAWINGS

Various needs are at least partially met through provision of a velocity matching imaging system for motion capture of a target element described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
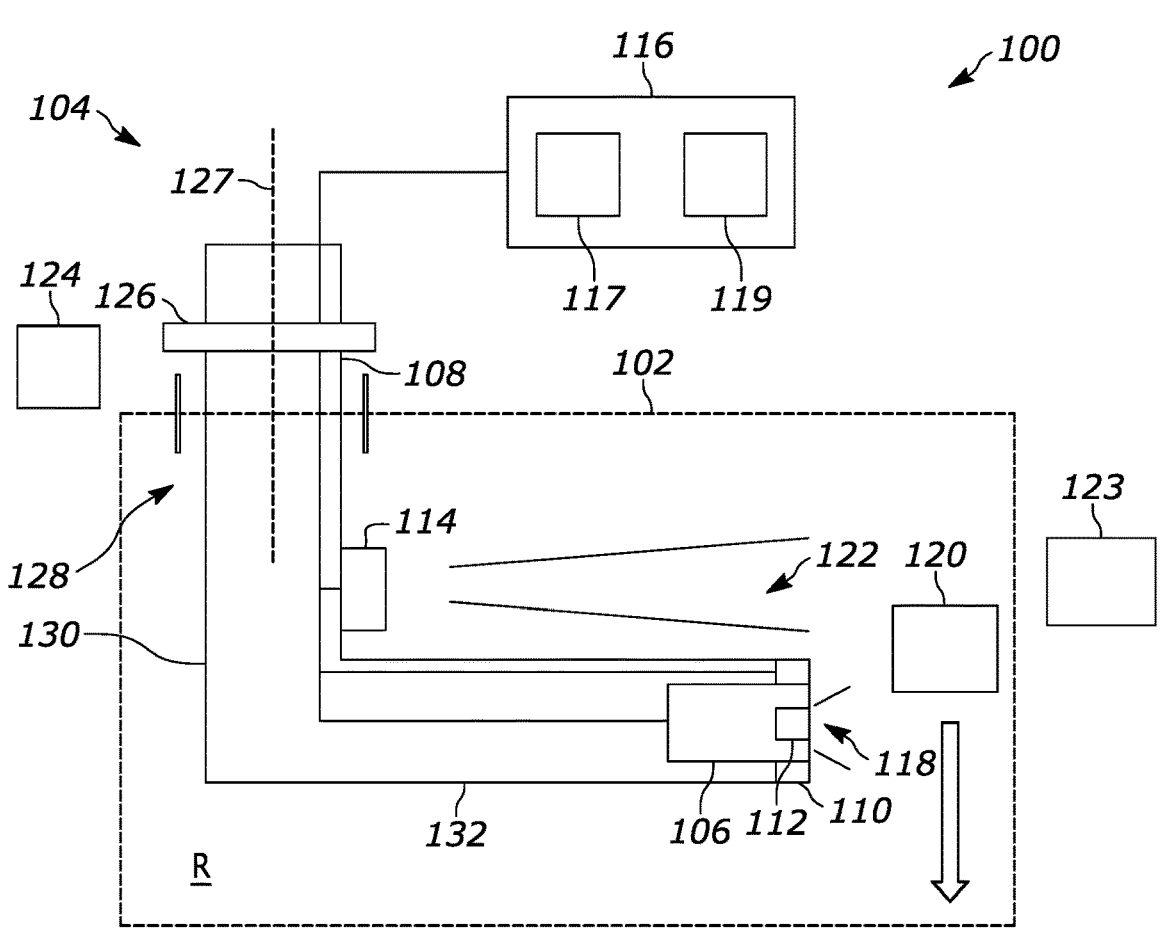
FIG. 1 shows a block diagram of an imaging system in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Borescope inspection is typically done periodically to assess the distress level of components inside a fully or partially assembled aircraft engine. Imaging inspections can be done under diffused lighting with continuous illumination and are performed in motion, with either the component moving while the camera is stationary or the camera moving with respect to the component. However, the still and video images captured under these conditions can include imaging artifacts, such as motion blur or the like, introduced due to the motion of the moving elements. Currently, low engine rotation speeds such as 0.1 or 0.2 revolutions per minute, intense illumination, and/or short exposure times are utilized to minimize the motion blur effect from movement of the components. Motion blur and other imaging artifacts can also be corrected using various image processing techniques, such as blind deconvolution, which characterizes the speed and angle of motion using image processing methods to estimate a point spread function for motion artifacts. Conventional techniques for artifact correction are commonly very processing intensive, take significant time to be applied, and can require layers of additional post processing (e.g., deconvolution) to correct for other artifacts introduced during post processing. These are all significant challenges in the context of imagining of aircraft components.

Generally speaking, the various aspects of the present disclosure are employed with a system that includes an image sensor and an actuator that is activated to move the image sensor at a similar speed and in a similar direction to a target element, such as rotating airfoils of a turbo engine. In some embodiments, the speed of rotation of the target element is taken as an input to set and trigger movement of a tool carrying the image sensor parallel to the component in motion so as to maintain the same frame of reference. When the imaging tool and component are moving in the same direction with generally the same speed, the image sensor and the target element are in a pseudo-static state. Images acquired in this state can achieve the full resolution of the image sensor without or with reduced motion artifacts. Once the images are acquired, the tool is reset to the original position and the motion is periodically repeated as the target element passes by the image sensor. In some embodiments, the speed input is identified by an external optical trigger, a proximity probe, an acoustic sensor, etc. In some embodiments, the target element includes a fan blade or similar rotating component of a turbofan engine, and a sensor device can count the number of blades passing by the image sensor in a preconfigured unit time and utilize the counted number and unit time to estimate the speed of the target element.

The foregoing and other benefits may become clearer upon making a thorough review and study of the following detailed description. Referring now to the drawings, and in particular to FIG. 1, a part inspection imaging system or inspection system 100 that is compatible with many of these teachings and for use in inspecting a system 102 such as an engine or the like will now be presented. The inspection system 100 includes a borescope unit 104 having a camera 106, a guide tube 108, and a light source 110. In some embodiments, the light source 110 is a standard light source integrated into the borescope unit 104. However, in some embodiments, the light source 110 is physically separate from the borescope unit 104. The light source 110 can include various different light emitting devices, such as a light emitting diode, an array of light emitting diodes, a xenon strobe light, a laser light source, a fiberoptic light transport, other direct local light sources, other indirect remote light sources, etc.

The guide tube 108 is used to position the camera 106 and/or the light source 110 at a desired location relative to the system 102, for example, an interior region R of the system 102. The distal end of the guide tube 108 is generally small and narrow and is fed into difficult to reach locations, such as the inside of objects or mechanical devices, including jet engines or the like. When placed inside the system 102, the camera 106 then relays image data captured thereby back to an eyepiece and/or a display where the inside of the system 102 can be viewed and magnified. For instance, the camera 106 can be used to obtain images of a target element 120 in the interior region R of the system 102. In some embodiments, the light source 110 is mounted on the guide tube 108 to be brought into position where the light source 110 can illuminate a target element 120 of the system 102.

In some embodiments, the borescope unit 104 is replaced with a snake-arm robot, such as any of those disclosed in U.S. Pat. Nos. 8,069,747B2, 7,543,518B2, U.S. Ser. No. 11/084,169B2 and European Patents EP2170565B1, EP3643451A1, EP3643452A1, each of which is incorporated by reference in their entirety. Snake-arm robots, like borescopes, are used to inspect confined spaces. Snake-arm robots are electro-mechanical devices that include an arm with high degrees of freedom that are controlled in a snake-like manner to follow a contoured path and avoid obstacles or comply when contacting obstacles. A snake arm robot typically includes a sequence of links that are driven by one or more motors and can move relative to one another to change the shape or curvature of the extension arm. In some embodiments, the inspection system 100 may include a rigid or flexible elongated extension element that is sized and shaped to insert the camera 106 and the light source 110 into a confined space, such as the interior of a jet engine, to perform inspection. It will also be appreciated that the inspection system 100 can be deployed in conjunction with non-confined space vision systems used to identify surface anomalies on an accessible portion of an object, for example, in a photo studio setting or the like.

The inspection system 100 includes a sensor 114 and a controller 116 that is communicatively and/or electrically coupled to the sensor 114, the camera 106, and/or the light source 110. The camera 106 is supported inside the guide tube 108 and includes an image sensor 112 with a field of view 118 for capturing one or more images of the target element 120 inside the system 102. In some embodiments, the image sensor 112 is located at a distal end of the borescope unit 104. The camera 106 can also include other optical elements, such as lenses and the like, that together with the image sensor 112 form an optical system with a resolution with respect to static (e.g. non-moving objects) that is defined in terms of line pairs per millimeter (lp/mm). In particular, lp/mm refers to the ability of the optical system to fully distinguish between a number of separately delineated same-sized black and white pairs of lines (i.e., the line pairs) presented in a specific spatial region a certain mm in length. As seen in FIG. 1, the controller 116 can include a programmable processor 117 and a memory 119. The processor 117 may include, for example, a microprocessor, a system-on-a-chip, an application specific integrated circuit (ASIC), and/or a field programmable gate array (FPGA). The memory 119 may include, for example, an electrical charge-based storage media such as EEPROM or RAM, or other non-transitory computer readable media.

Where the system 102 includes a jet engine or the like, the target element 120 can include one or more fan blades, compressor blades, turbine blades, stator airfoils, nozzles, guide vanes, shrouds casings, combustor liners, and/or other elements of the engine. Furthermore, the sensor 114 includes a sensing region 122 in which the sensor 114 detects movement of the target element 120 relative to the sensor 114, for example relative movement of a blade or shaft encoder to detect blade presence in multiple stages. It will be appreciated that in cases where the camera 106 is used to inspect stationary elements the controlled movement of the camera 106 as described herein is superimposed on gross motion of the inspection system 100 at the camera 106 and not at or via a base of the borescope unit 104 or similar insertion device.

In some embodiments, the target element 120 is moved by a turning tool 123. The turning tool 123 can control the operating velocity of the target element 120 within the interior region R either at the direction of the controller 116 or a different controller distinct from the controller 116. For example, the turning tool 123 can rotate a shaft of an engine to in turn rotate fan blades that include the target element 120 inside the interior region R. In some embodiments, the operating velocity of the target element 120 is in the range of about 1 mm/s to about 50 mm/s. Furthermore, in some cases the camera 106 is used to image a stationary object. In such cases, the turning tool 123 can be used to transport the camera 106, mounted on a moving element of the engine, for example a blade, rotor or shaft, with respect to the stationary object.

In some embodiments, the sensor 114 is used to detect movement of another portion of the system 102 that is linked to the target element 120, for example a shaft or rotor of a jet engine. The sensor 114 is coupled to the guide tube 108 for insertion into the system 102 along with the borescope unit 104. Alternatively, the sensor 114 is a standalone device that is separately positionable relative to the system 102 proximate to the target element 120. The sensor 114 can include, but is not limited to, various contact and non-contact motion sensing devices, such as a whisker or electrical continuity sensor or switch, a roller type switch, an inductive proximity sensor, an optical proximity sensor, a hall effect sensor, an electrical continuity sensor, an ultrasonic sensor, etc. Where the sensor 114 is a contact sensor, such as a switch, the sensing region 122 can include a region in which the contact sensor physically traverses. In some embodiments, where the sensor 114 is triggered off of a rotor or shaft of the system 102, the sensor 114 can include a roller located on the shaft or rotor, a motion flow sensor such as in an optical or laser mouse, a gyroscope or inertial measurement unit (IMU) attached to the shaft or rotor, a pull thread temporarily attached to the shaft or rotor, or other similar devices.

The inspection system 100 also includes an actuator 124. The actuator 124 is configured to cause a controlled movement of the image sensor 112 relative to the target element 120. In some embodiments, the controller 116 is configured to activate the actuator 124 to perform the controlled movement. The controlled movement brings a speed and movement direction of the image sensor 112 to within a range of at least about 20% to about 1% of the operating velocity of the target element 120 during an imaging period that encompasses a designated exposure time for the image sensor 112. In some examples, the designated exposure time is in a range from about 1 ms to about 50 ms. In some embodiments where the turning tool 123 is used to move the target element 120, the actuator 124 is linked to the turning tool 123 such that rotation of the target element 120 at the operating velocity induces the controlled movement.

Furthermore, in some embodiments, the inspection system 100 includes a movement guide 126. The movement guide 126 is configured to induce the controlled movement of the image sensor 112 applied by the actuator 124 to follow a preconfigured path. In some embodiments, the movement guide 126 is coupled to the borescope unit 104. The preconfigured path can include a curved path of the target element 120 around a rotational axis (e.g., a rotation point of an engine fan blade or the like), a linear path perpendicular to a tool axis 127 through which the image sensor 112 is inserted into the interior region R, or other. As shown in FIG. 1, the image sensor 112 is inserted into the interior region R through a port 128 of the system 102. In particular, where the image sensor 112 is part of the borescope unit 104, a distal end of the borescope unit 104 is inserted through the port 128 along the tool axis 127 so that a first portion 130 of the borescope unit 104 passes through the port 128 and a second portion 132 of the borescope unit 104 is disposed at a generally perpendicular angle to the first portion 130 within the interior region R. The first portion 130 and the second portion 132 is a subset of various elongated portions of the borescope unit 104 that are angled with respect to each other. In some embodiments, the angles between the different elongate portions (including between the first portion 130 and the second portion 132) are adjustable to enable the field of view 118 of the image sensor 112 to include an area of the interior region R through which the target element 120 moves.

Figure 2:
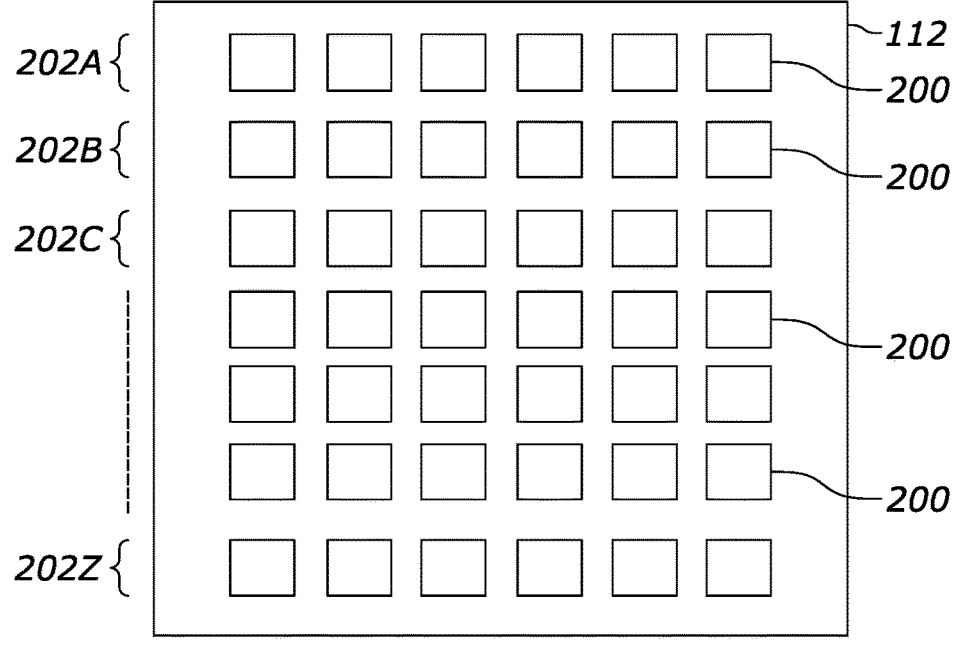
FIG. 2 shows a schematic diagram of an image sensor in accordance with various embodiments of these teachings.

With reference now to FIG. 2, the image sensor 112 includes a plurality of light sensitive pixel elements 200 that are activatable. The plurality of light sensitive pixel elements 200 are arranged in discrete rows 202A, 202B, 202C, 202Z, etc. as shown in FIG. 2. The plurality of light sensitive pixel elements 200 are activated simultaneously, individually on a rolling basis, and/or by discrete rows on a rolling basis. The designated exposure time includes the time period over which the plurality of light sensitive pixel elements 200 are active. Thus, for situations where the activation is done on a rolling basis, the designated exposure time begins when the first pixel is activated and ends when the last pixel is deactivated. When activated, each one of the activated light sensitive pixel elements 200 generates a digital signal representative of light viewable by that pixel element when active. The camera 106 and/or the controller 116 can convert those digital signals into image data that is viewable on a display device by an operator of the inspection system 100. In some embodiments, the controller 116 determines an activation time for the image sensor 112 (e.g., the time when the light sensitive pixel elements 200 are activated for the exposure time) based on the operating velocity of the target element 120 relative to an initial position of the image sensor 112 within the interior region R. Furthermore, the controller 116 can be configured to activate the image sensor 112 at the activation time.

In general, the controller 116 can synchronize the activation time of the image sensor 112 with the movement of the target element 120. In particular, the controller 116 can identify the operating velocity of the target element 120 and base the activation time of the image sensor 112 on the identified operating velocity. The controller can receive user input that identifies the operating velocity directly or determine the operating velocity using the sensor 114. In particular, a trigger signal or condition such as a detection signal that is sent or transmitted from the sensor 114, is received at the controller 116, and indicates the presence of movement within the sensing region 122 is utilized to determine the operating velocity and/or to directly initiate activation of the image sensor 112. As such the detection signal can detect a position of a fan blade to synchronize with the frame rate of the camera 106.

In some embodiments, the controller 116 utilizes a time delay as measured from receipt of the detection signal to synchronize the activation of the image sensor 112 with the movement of the target element 120. Specifically, the time delay is used to ensure that the target element 120 is within the field of view 118 when the image sensor 112 is activated. The time delay is set to a time value measured from receipt of the detection signal to the occurrence of a specific frame in a sequence of frames being captured by the image sensor 112. The specific frame can be a set first number of frames before a key frame that will include the target element 120. The set number of frames can be based on a known or average revolutions per minute (RPM) associated with the target element 120. Furthermore, the image sensor 112 is activated until a second set number of frames after the key frame.

The first and second set number of frames are dependent on the precise nature of the rotation of the target element 120. For example, where the RPM of the target element 120 is generally constant and non-variable (e.g., when moved by use of a precise version of the turning tool 123) the first and second set numbers of frames are one. However, where the RPM of the target element 120 is more variable or uncertain (e.g. by a version of the turning tool 123 with a varying turning tool speed), the first and second set numbers of frames are a higher number such as ten frames to ensure that the target element 120 is captured by the image sensor 112.

The time delay can also be set based on an average RPM of the target element 120. In some embodiments, the controller 116 determines the average RPM from repeated receptions of the detection signal. The time delay is determined using time and/or distance synchronization. In particular, time synchronization can include utilizing a known travel time between a location of the sensor 114 and the field of view 118 and distance synchronization can include utilizing a known distance between a location of the sensor 114 and the field of view 118. Furthermore, in some embodiments, the first and second set numbers of frames are determined as a function of an observed standard deviation in the operating velocity of the target element 120 relative to the stationary initial position of the image sensor 112.

It will be understood that the movement detected by the sensor 114 is the movement of the target element 120 or the movement of another element associated with the target element 120. For example, where the target element 120 is part of a group of moving elements that move through the sensing region 122 on a repeating and periodic basis, the movement that initiates the blade detection signal is the movement of a preceding or succeeding element in the group. Specifically, where the target element 120 includes a fan blade of a jet engine, a trigger for the controller to activate the image sensor 112 and capture one or more images of that specific fan blade is the presence of another of the fan blades within the sensing region 122. Furthermore, the motion detected by the sensor 114 is the motion of the shaft or rotor of the engine.

In some embodiments, where the target element 120 includes elements from within multiple stages of an engine, such as the stage of fan blades and multiple stages of other elements and airfoils (e.g. stator airfoils, rotor airfoils, compressor vanes, compressor blades, turbine blades, turbine buckets, turbine vanes, etc.), the sensor 114 is configured to detect movement relative to a single common reference point for each of the multiple stages. For example, the single common reference point can include a shaft of the engine or the movement of blades within one stage. In these embodiments, illumination, imaging, and movement of the borescope unit 104 for each stage is done simultaneously via multiple borescope units 104 and using a known clocking of each of the stages.

In some embodiments, the sensor 114 is omitted. In these embodiments, synchronization of the activation of the image sensor 112 with the movement of the target element 120 is accomplished using a known repeating and periodic movement relative to the field of view 118 based on a known frequency and duration of the repeating periodic motion of the target element 120 (e.g., a known clocking rate of the target element 120). Furthermore, in embodiments where the exact clocking rate of the target element 120 is not known and the sensor 114 is also omitted, the synchronization of the activation of the image sensor 112 and the movement of the target element 120 is accomplished using the image sensor 112 and a time delay calibration method such as described in U.S. patent application Ser. No. 18/141,493 filed on May 1, 2023, which is incorporated by reference in its entirety.

Figure 3:
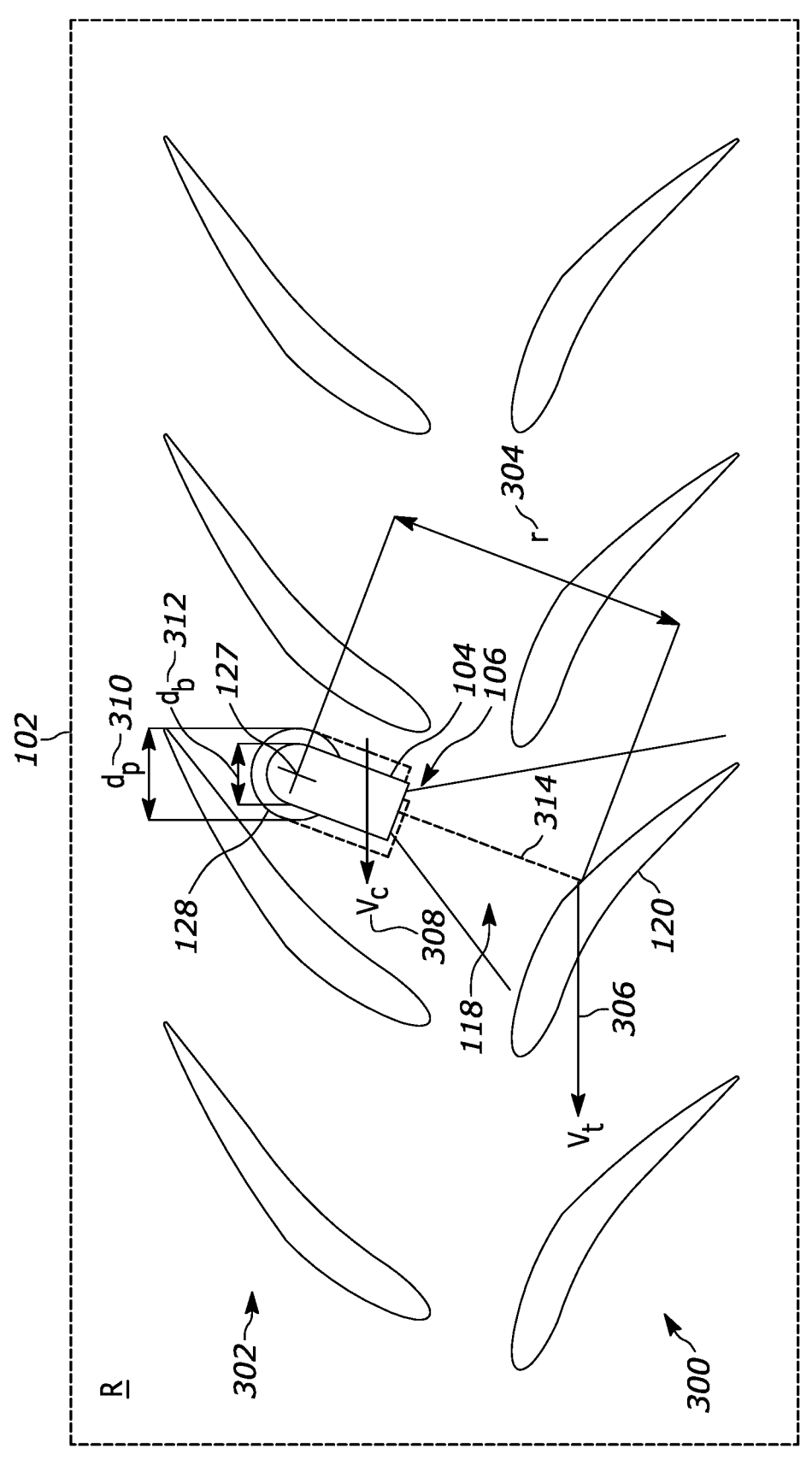
FIG. 3 shows a partial schematic diagram of an interior region of a part being inspected containing a target element in accordance with various embodiments of these teachings.

With reference now to FIG. 3, the target element 120 is one of a first set of airfoils 300 of the system 102. The first set of airfoils 300 can include a set of blades mounted together on a shaft, disc, or blisc, and capable of rotating together about a common axis relative to stationary stator vanes 302. As shown in FIG. 3, the operating velocity of the target element 120 can include a linear velocity 306 of a point on the target element 120 that is a distance 304 from the tool axis 127 and in line with a central ray 314 of the image sensor 112 (FIG. 1). In FIG. 3, the controlled movement caused by the actuator 124 (FIG. 1) is a linear velocity 308 with a directional component that is linear and oriented parallel or tangential to the linear velocity 306 and generally perpendicular with respect to the tool axis 127. The controlled movement takes place entirely within a clearance defined by a difference between a first diameter 310 of the port 128 and a second diameter 312 of the longer section of the borescope unit 104 that passes through the port 128 and is configured to avoid any of the stationary stator vanes 302 or other obstacles present in the interior region R. In some embodiments, the clearance distance is in a range from about 0.1 mm to about 4 mm. In some embodiments, the minimum clearance for the controlled movement may be between some other position or obstacle in the interior region R and a different part of the borescope unit 104.

The borescope unit 104 may include a bend or protrusion on which the camera 106 is mounted such that the tool axis 127 is parallel to the direction of view of FIG. 3 (e.g., in/out of the page). In this case, the borescope unit 104 is L-shaped, in which the vertical stroke of the L represents the long shaft, while the horizontal stroke represents the camera 106. In other instances, the camera 106 may be positioned so that the field of view 118 is at an angle to the shaft but be housed within the second diameter 312. In other embodiments, the transition from an axis of the camera 106 to the tool axis 127 may be curved or offset such that the two axes do not intersect (e.g., there may be more a complex transition from the shaft to the camera 106 then as shown in FIG. 3). The shaft and the camera body may be approximately linear or may be shaped for access or for obstacle avoidance in more complex manners understood by those having skill in the art.

The controlled movement is configured to move the camera 106 and thus the image sensor 112 so that the motion of at least one point on the target element 120 (e.g. one or more of the first set of airfoils 300) is slowed relative to at least one ray entering the camera lens (e.g. the central ray 314). This slow down produces a relative motion of the key point on the target element 120 as projected to an image plane of the camera 106 that is reduced to minimize or reduce image blur. The relative speed between the target element 120 and the image sensor 112 is configured to be slow or stationary for the exposure time $t_e$ of the image sensor 112.

FIG. 3 generally shows a projection looking from an engine center outwards along the tool axis 127 in which the first set of airfoils 300 are shown as moving in the linear velocity 306. However, it will be appreciated that FIG. 3 shows a flat representation of a set of objects (e.g. the first set of airfoils 300) mounted on a cylindrical support (shaft or disc) which rotates about the engine centerline. In some embodiments, the controlled movement of the image sensor 112 is at least partially curved to match the rotation of the target element 120 about the engine centerline to ensure that all points on the blade are projected to fixed positions in an image plane of the camera 106 for the duration of the exposure time. In some embodiments, the movement guide 126 is configured to constrain movement of the borescope unit 104 or similar support structure for the camera 106 induced by the actuator 124 to follow the partially curved path that matches the rotational path of the target element 120 around the engine centerline.

Figure 4:
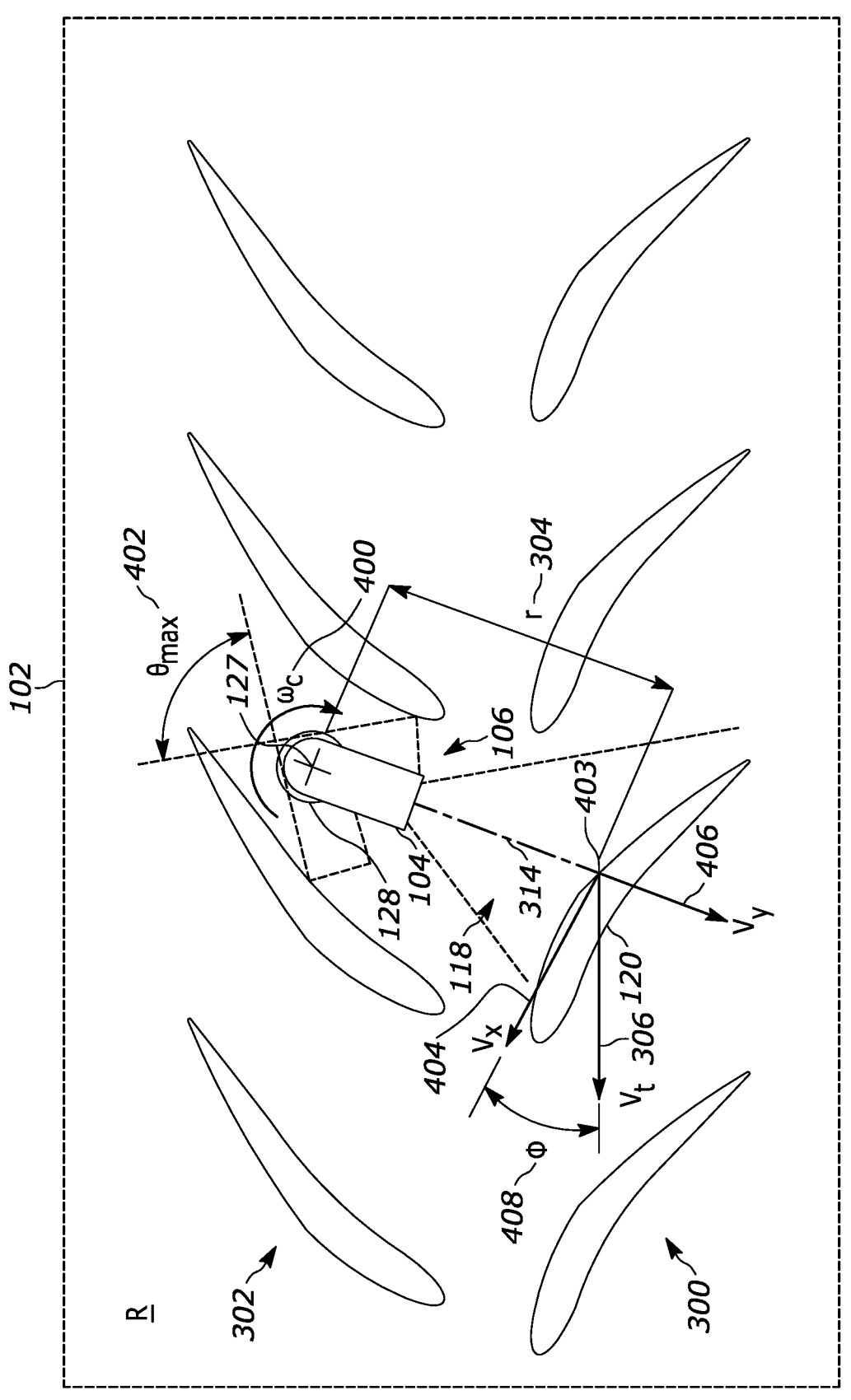
FIG. 4 shows a partial schematic diagram of an interior region of a part being inspected containing a target element in accordance with various embodiments of these teachings.

Furthermore, as seen in FIG. 4, in some embodiments, the controlled movement induced by the actuator 124 (FIG. 1) is an angular velocity 400 around the tool axis 127. In particular, the actuator 124 is configured to oscillate the borescope unit 104 in a rotary manner around the tool axis 127. In these embodiments, there is relatively less clearance between the borescope unit 104 and the port 128 as compared with the generally linear motion described with respect to FIG. 3. Because of the rotary motion, the limitation on the maximum amount of the controlled motion is defined by angular limits within the interior region R instead of the difference between the first diameter 310 and the second diameter 312. These angular limits include a maximum angular displacement 402 at which the camera 106 (or other relevant section of the borescope unit 104) would contact the stationary stator vanes 302 adjacent the port 128 and/or other obstacles present within the interior region R. Thus, use of the rotational angular velocity 400 in place of the linear velocity 308 can enable matching of the operating velocity for cases where the clearance between the first diameter 310 and the second diameter 312 of FIG. 3 are small enough to make linear motion ineffective or cost prohibitive such as clearances that are less than 1 mm, less than 2 mm, or less than 4 mm.

Given the rotational nature of the controlled movement, matching the linear velocity 306 of the target element 120 to the angular velocity 400 is defined with reference to a key point 403 on the target element 120. In particular, the actuator 124 (FIG. 1) is configured to match the speed and direction (e.g., the linear velocity 306) of the movement of the central ray 314, where the central ray 314 is defined from a center point of the camera lens to the key point 403. The key point 403 moves at the linear velocity 306, which can be broken down into a horizontal component 404 perpendicular to the central ray 314 and a vertical component 406 parallel to the central ray 314. The horizontal component 404 and vertical component 406 are vectors that when summed together equal the linear velocity 306. The rotational speed for the camera 106 that matches the linear velocity 306 can be determined using circular motion equations 1-3 below. The variables $v_x$, r, $\omega_c$, $v_t$, and Ø in equations 1-3 correspond, respectively, to a magnitude of the horizontal component 404, the distance 304, a magnitude of the angular velocity 400, a magnitude of the linear velocity 306, and an angle 408 between the linear velocity 306 and the horizontal component 404.

$$v_x = r\omega_c \qquad \text{Equation 1}$$

$$v_x = v_t\cos(\emptyset) \qquad \text{Equation 2}$$

$$\omega_c = \frac{v_t\cos(\emptyset)}{r} \qquad \text{Equation 3}$$

Figure 5:
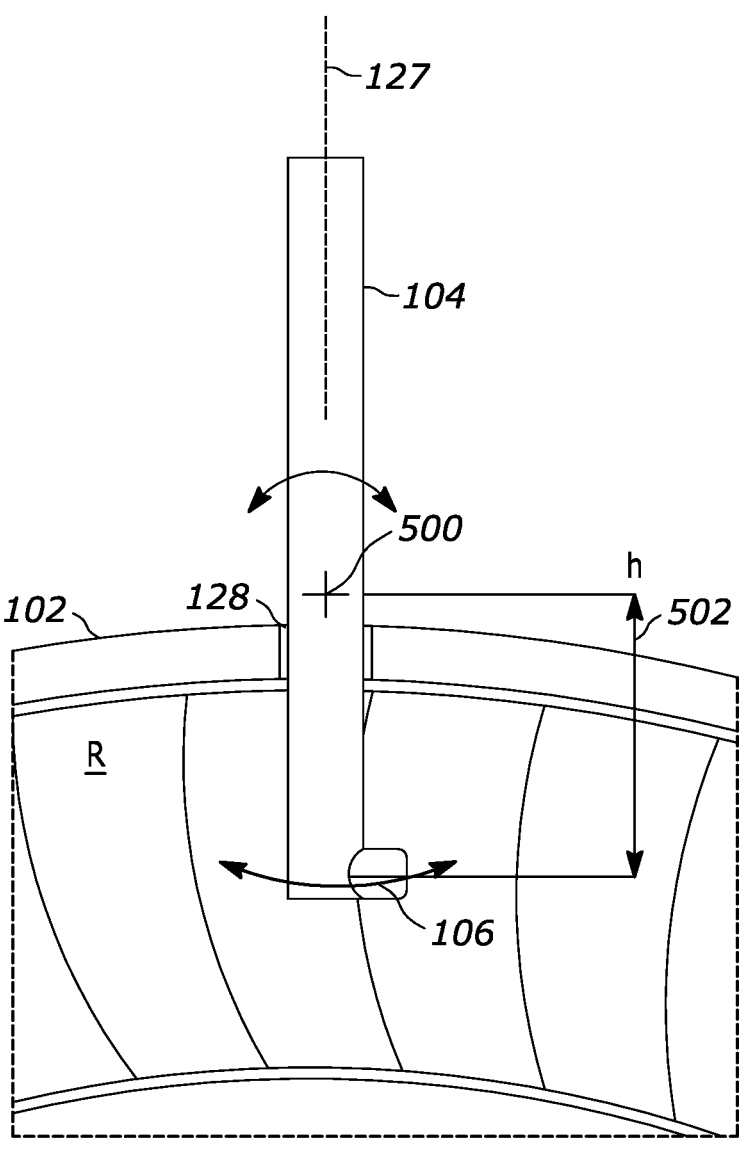
FIG. 5 shows a partial cross-section of a system being imaged in accordance with various embodiments of these teachings.

With reference now to FIG. 5, it will be further appreciated that the actuator 124 (FIG. 1) can be configured to induce the controlled movement as a hybrid or combination of the linear and revolution arrangements of FIGS. 3 and 4. In particular, the actuator 124 can be configured to cause a rotational movement around a pivot axis or rotational axis 500 to perform the controlled movement. The rotational axis 500 is located at a point outside the interior region R and is disposed perpendicular to the tool axis 127 at a distance 502 from the camera 106. As shown in FIG. 5, the rotational axis

500 is located proximate to an exterior casing of the system 102 to reduce the amount of lateral motion of the borescope unit 104 within the port 128, and provide for a near-linear motion of the camera 106 at the distal end of the borescope unit 104. Furthermore, longer lengths for the distance 502 then shown in FIG. 5 are possible. Such increased values of the distance 502 result in less rotation of the camera 106 within the interior region R.

Figure 6:
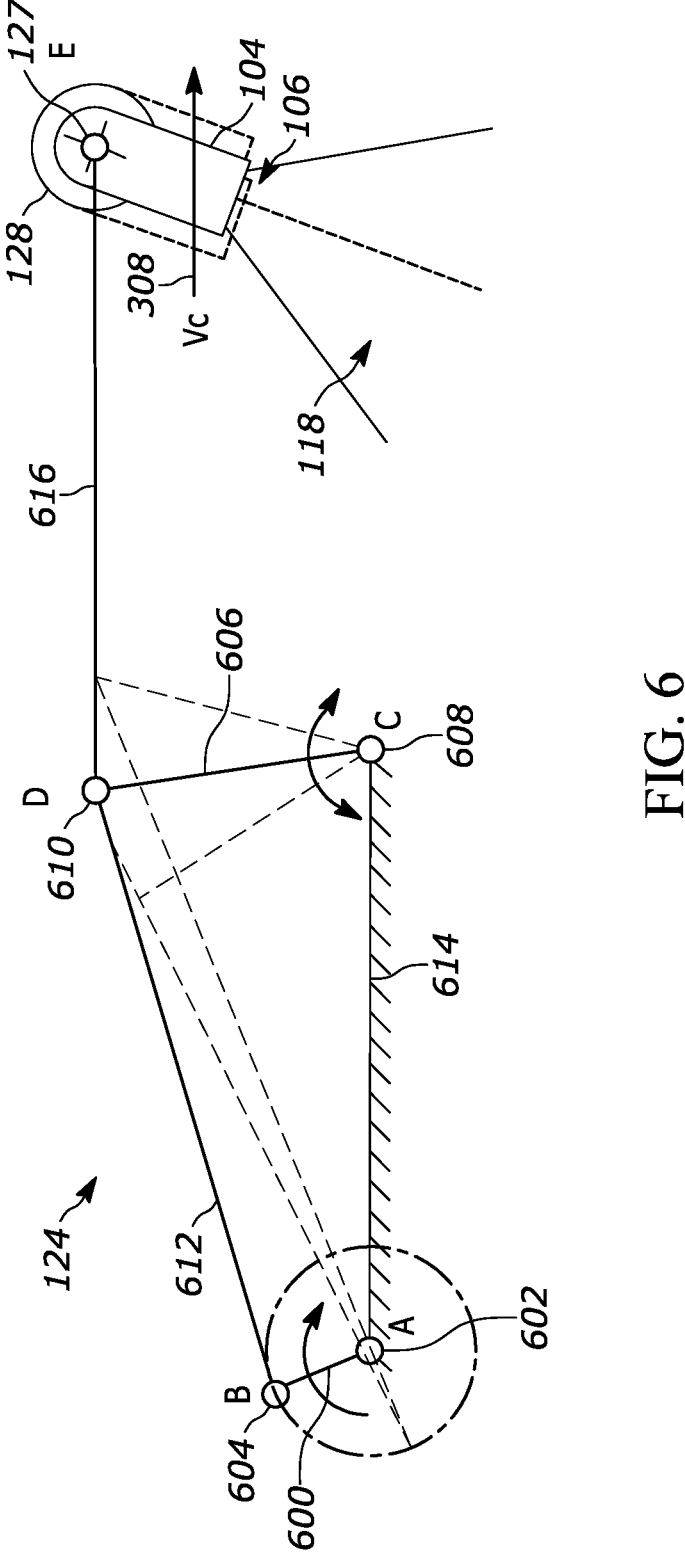
FIG. 6 shows a schematic diagram of an actuator in accordance with various embodiments of these teachings.

With reference now to FIGS. 6-9, different embodiments for the actuator 124 will be discussed in more detail. FIG. 6 shows a crank and rocker arrangement for the actuator 124. Specifically, the actuator 124 includes a crank 600 that rotates continuously about a point 602 and that has a fixed non-zero length between the point 602 and a point 604. The actuator 124 further includes a rocker 606 that rotates about a point 608 and has a fixed non-zero length between the point 608 and a point 610. The crank 600 and the rocker 606 are connected by a linkage 612 having a fixed non-zero length between the point 604 and the point 610. The points 602 and 608 are stationary relative to a common frame of reference such as an engine casing or other exterior portion of the interior region R. As the crank 600 rotates continuously about the point 602, the rocker 606 moves in a reciprocating arcuate motion about the point 608.

As shown in FIG. 6, the camera 106 and/or the borescope unit 104 is coupled to the rocker 606 at the point 610 by a linkage 616. The linkage 616, either alone or in combination with the movement guide 126 (FIG. 1), can convert the rotary motion of the rocker 606 into a general linear motion applied to the camera 106 and/or the borescope unit 104 (e.g., the linear velocity 308). For these and similar linear motion embodiments describe herein, the movement guide 126 (FIG. 1) can include a linear slide or guide. In some embodiments, the conversion of the rotary motion to linear motion is accomplished by separating out the rotational and linear components of the rotation of the rocker 606.

Alternatively, in some embodiments, the camera 106 and/or the borescope unit 104 is coupled directly to or in close proximity to the point 610. In these embodiments, the shape of the controlled movement induced by the actuator 124 is a function of the distances between the various points 602, 604, 608, and 610. For example, if a length 614 between the point 602 and the point 608 and a length of the rocker 606 are long compared to lengths of the crank 600 and the rocker 606, the motion of the rocker 606 at the point 610 will tend towards a sinusoidal linear motion. However, different relative distances between the various points 602, 604, 608, and 610 can induce the motion of the rocker 606 at the point 610 to tend towards rotational motion for use in applying the angular velocity 400 as shown in FIG. 4.

Figure 7:
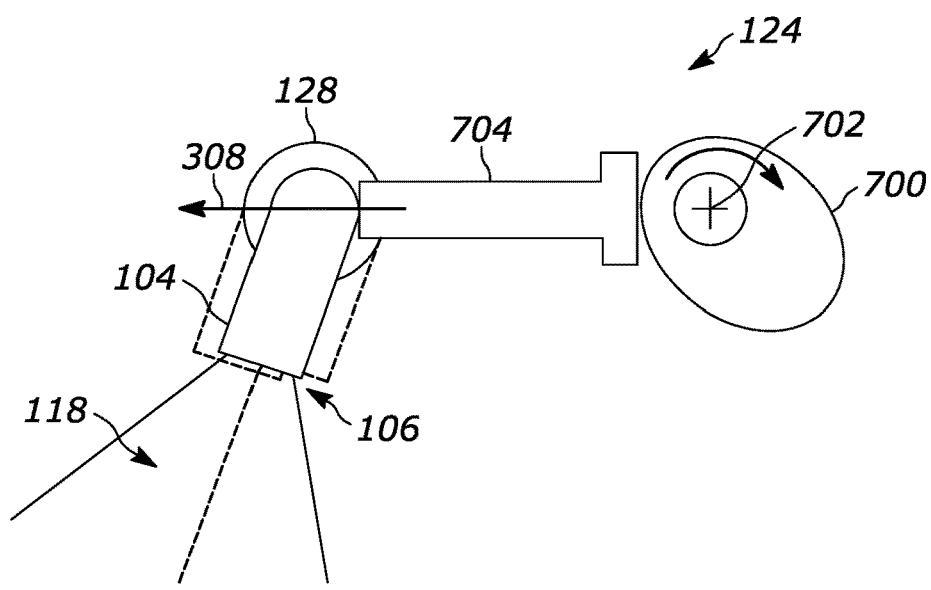
FIG. 7 shows a schematic diagram of an actuator in accordance with various embodiments of these teachings.

FIG. 7 shows a cam and cam follower arrangement for the actuator 124. Specifically, the version of the actuator 124 shown in FIG. 7 includes a cam 700 that rotates about a rotational axis 702 and a follower 704 that linearly and/or rotationally translates the camera 106 and/or the borescope unit 104 based on a physical profile of the cam 700. In some embodiments, the profile of the cam 700 may be configured to provide the precise matched velocity (e.g. the linear velocity 308 and/or the angular velocity 400 (FIG. 4)) during the exposure period of the camera 106 without error and with minimal acceleration and jerk during each phase of the controlled movement.

Figure 8:
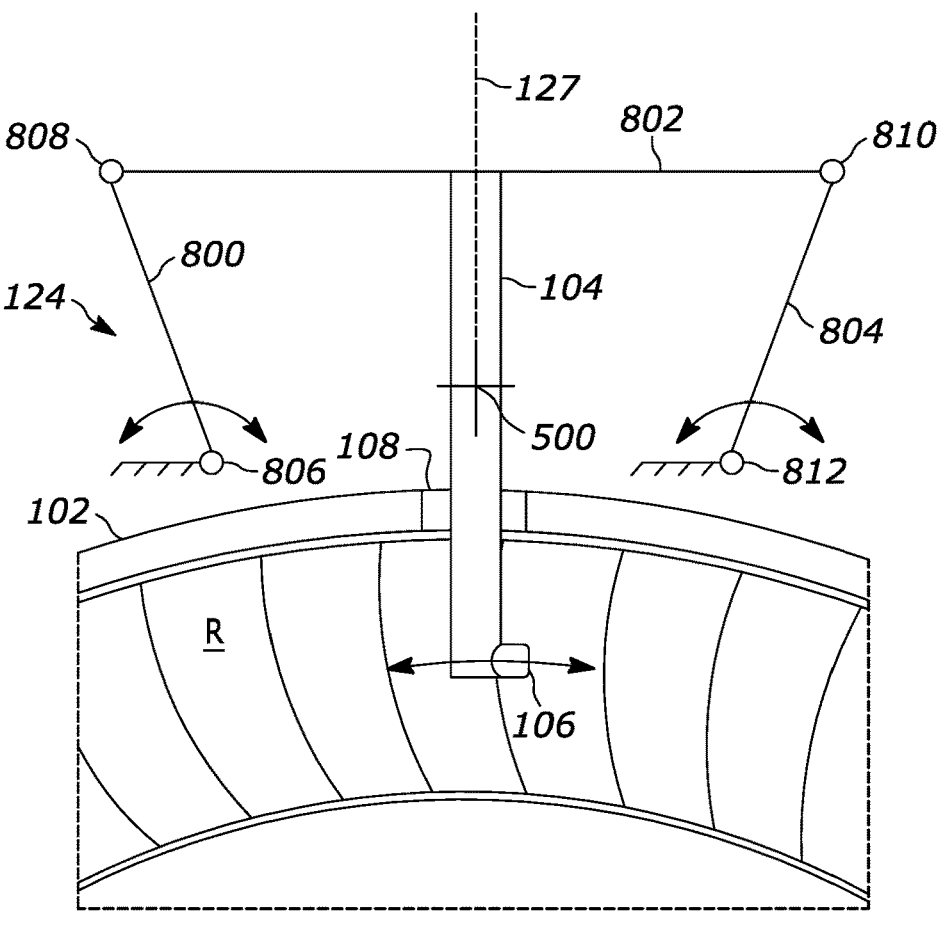
FIG. 8 shows a schematic diagram of an actuator in accordance with various embodiments of these teachings.

FIG. 8 shows a four-bar linkage embodiment of the actuator 124. The four-bar linkage shown in FIG. 8 comprises linkages 800, 802, and 804 coupled together at pivot points 806, 808, 810, and 812. In particular, the linkage 800 is coupled to the linkage 802 at the pivot point 808 and the linkage 802 is coupled to the linkage 804 at the pivot point 810. The pivot points 812 and 806 are fixed to the exterior or other portion of the system 102 to serve as a fourth linkage. Furthermore, the linkage 802 is coupled to the borescope unit 104. In operation, the pivot point 806 and/or the pivot point 812 are actively rotated to induce rotational movement of the linkages 800, 802, and 804 which in turn induce the controlled movement on the borescope unit 104 and/or the camera 106. For example, the four-bar linkage is arranged so that the controlled movement imparted to the borescope unit 104 and/or the camera 106 approximates the rotational motion of the target element 120 around the centerline of a rotating turbofan engine, such as by rotating the borescope unit 104 about the rotational axis 500.

Figure 9:
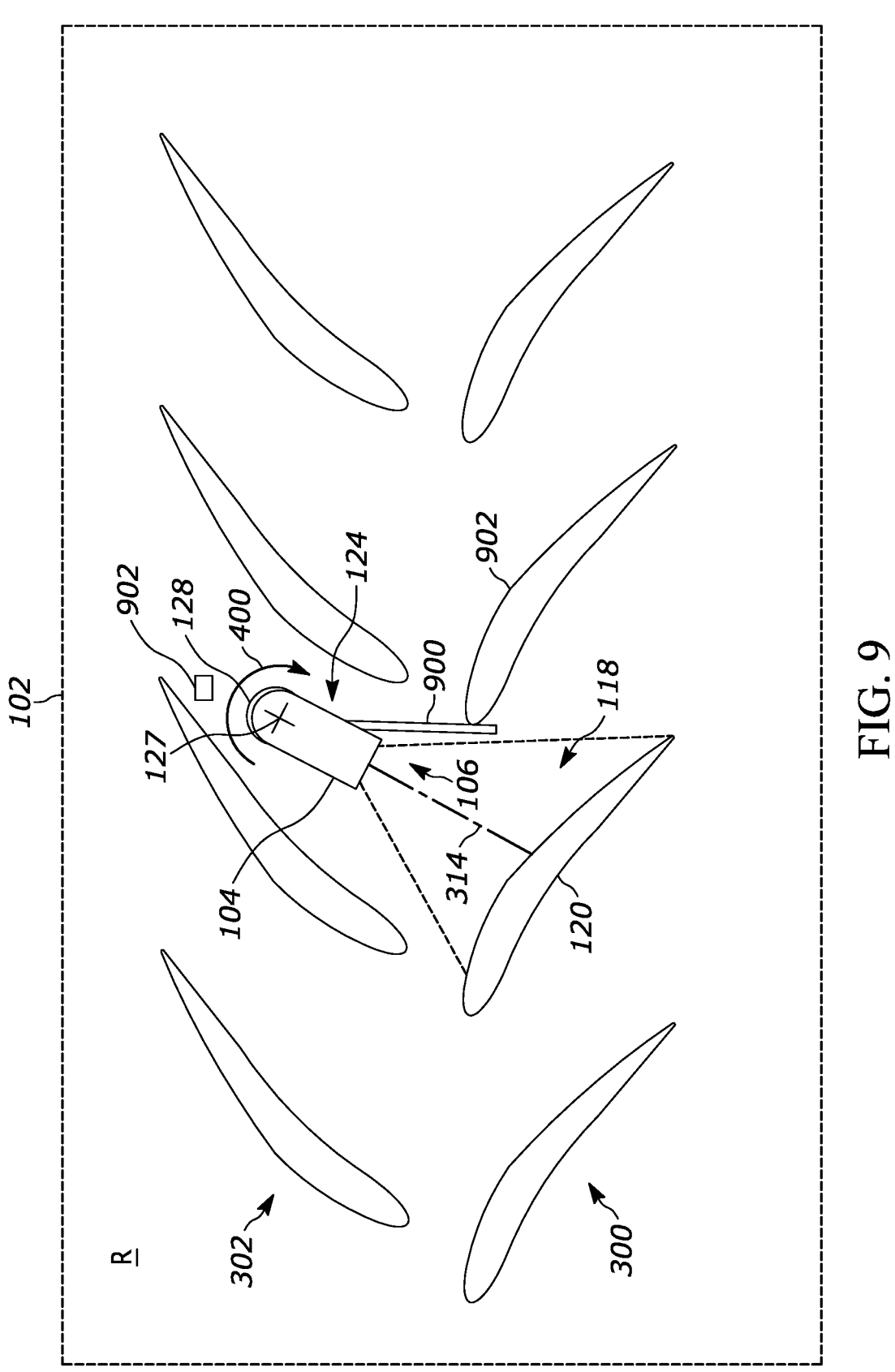
FIG. 9 shows a partial schematic diagram of an interior region of a part being inspected containing a target element and an actuator in accordance with various embodiments of these teachings.

FIG. 9 shows a passive mechanical embodiment of the actuator 124 that transfers the movement of the first set of airfoils 300 into the angular velocity 400 and/or the linear velocity 308. As shown in FIG. 9, the actuator 124 comprises a finger member 900 or similar rigid or semi-rigid projection attached to the borescope unit 104, for example to the guide tube 108 (FIG. 1). The finger member 900 is made of or coated with a polymer or similar material configured to prevent or limit damage to the stationary stator vanes 302 and the first set of airfoils 300. Additionally, the actuator 124 comprises a spring or similar mechanism 902 that biases the borescope unit 104 into the initial position and in a direction against the motion of the first set of airfoils 300 (e.g., in a counter-clockwise direction opposite the angular velocity 400 or in a linear direction opposite the linear velocity 308). The spring is active at all times after the borescope unit 104 is inserted through the port 128.

In operation, as the first set of airfoils 300 are rotated, a trailing airfoil 902 that trails the target element 120 contacts the finger member 900 when the target element 120 is within or nearly within the field of view 118. In some embodiments, the sensor 114 (FIG. 1) and/or another similar sensor can detect the position of the borescope unit 104 and/or the position of the target element 120 to trigger activation of the image sensor 112 of the camera 106. The trailing airfoil 902 continues to move and induce rotational and/or linear movement on the camera 106 and/or the borescope unit 104 via the finger member 900 by overcoming the biasing force of the spring. Eventually, the borescope unit 104 reaches a point where the finger member 900 slips over the leading edge of the trailing airfoil 902 at which point the bias force imparted by the spring causes the borescope unit 104 to return to the initial position. In some embodiments, the finger member 900 is connected to the tool axis 127 via a gearbox or similar leverage providing member to better match the speed of the camera 106 to the speed of the first set of airfoils 300.

Additional embodiments for the actuator 124 beyond those shown and described with respect to FIGS. 6-9 are also possible. For example, the actuator 124 can include a linear actuator, a voice coil, a torque motor, or other mechanical, magnetic, or piezoelectric actuator. The actuator 124 can also include different combinations of the various different embodiments for the actuator 124 described herein. The various embodiments are used in conjunction with either the linear, revolute, and/or hybrid variants of the controlled movement as described herein. In particular, the torque motor may be utilized for revolute variants of the controlled movement. The crank and rocker mechanism of FIG. 6 may be used for both cases, except that in the revolute case, the camera 106 and/or the borescope unit 104 is mounted with a centreline at the point 608, to rotate about the point 608. The cam and cam follower example may also be used for both variations, except that for the revolute case the camera 106 and borescope unit 104 are provided with the follower 704 on a lever arm having a radius on which the cam 700 acts. Furthermore, different embodiments for the movement guide 126 may be utilized for the different variations of the controlled movement. In particular, for the linear variation, the movement guide 126 can include linear motion elements such as slides and guides used to constrain the borescope unit 104 and/or camera 106 to linear motion. For the revolute case, the movement guide 126 can include curved guides, curved guideways, ball slides or the like that contain the camera 106 and/or the borescope unit 104 to move in an arc around a centreline approximately co-located with a centreline of the system 102 around which the target element 120 rotates, so as to more precisely match the motion of the blades.

Figure 10:
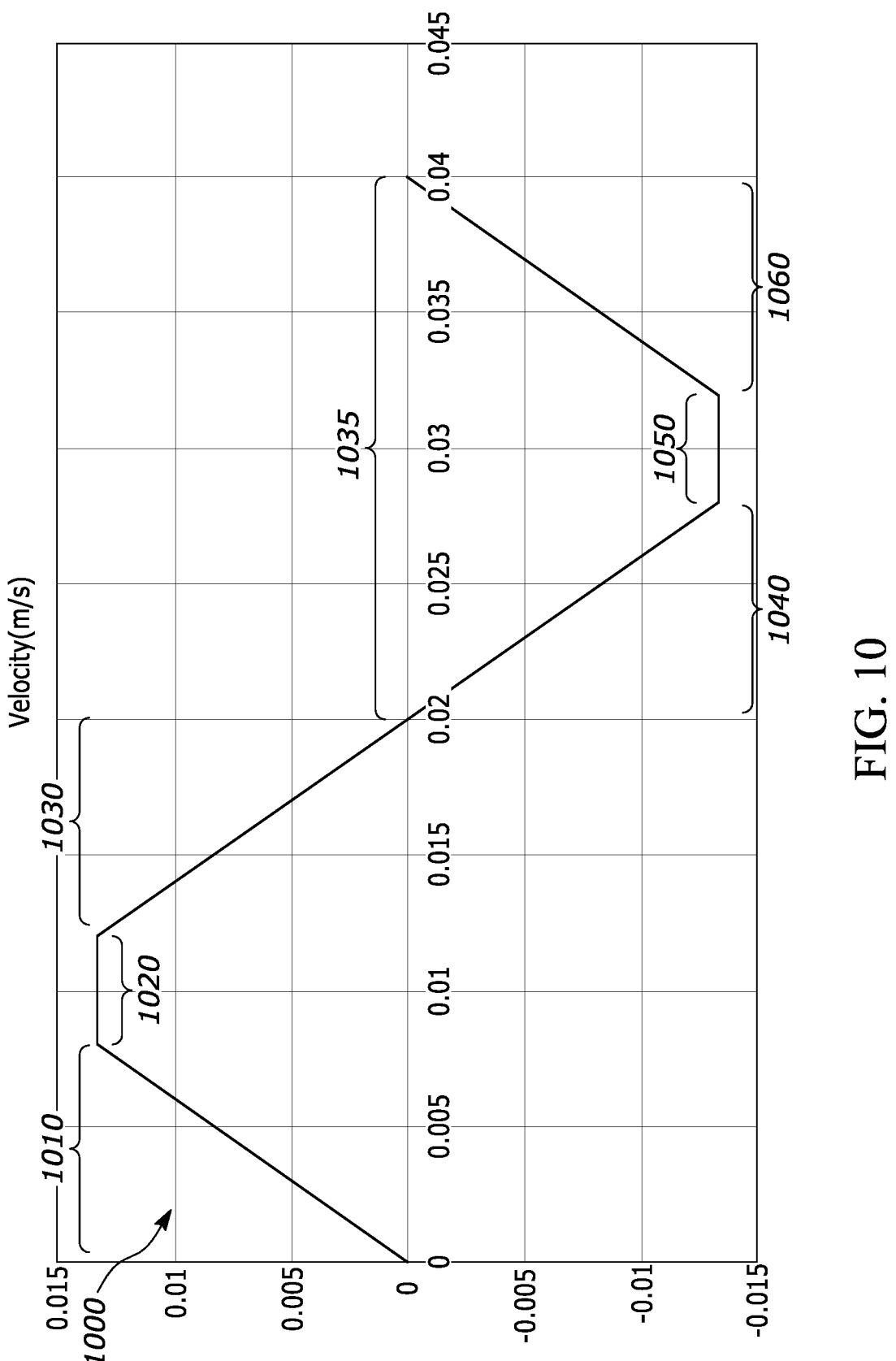
FIG. 10 shows a graph of an image sensor velocity pattern in accordance with various embodiments of these teachings.
Figure 11:
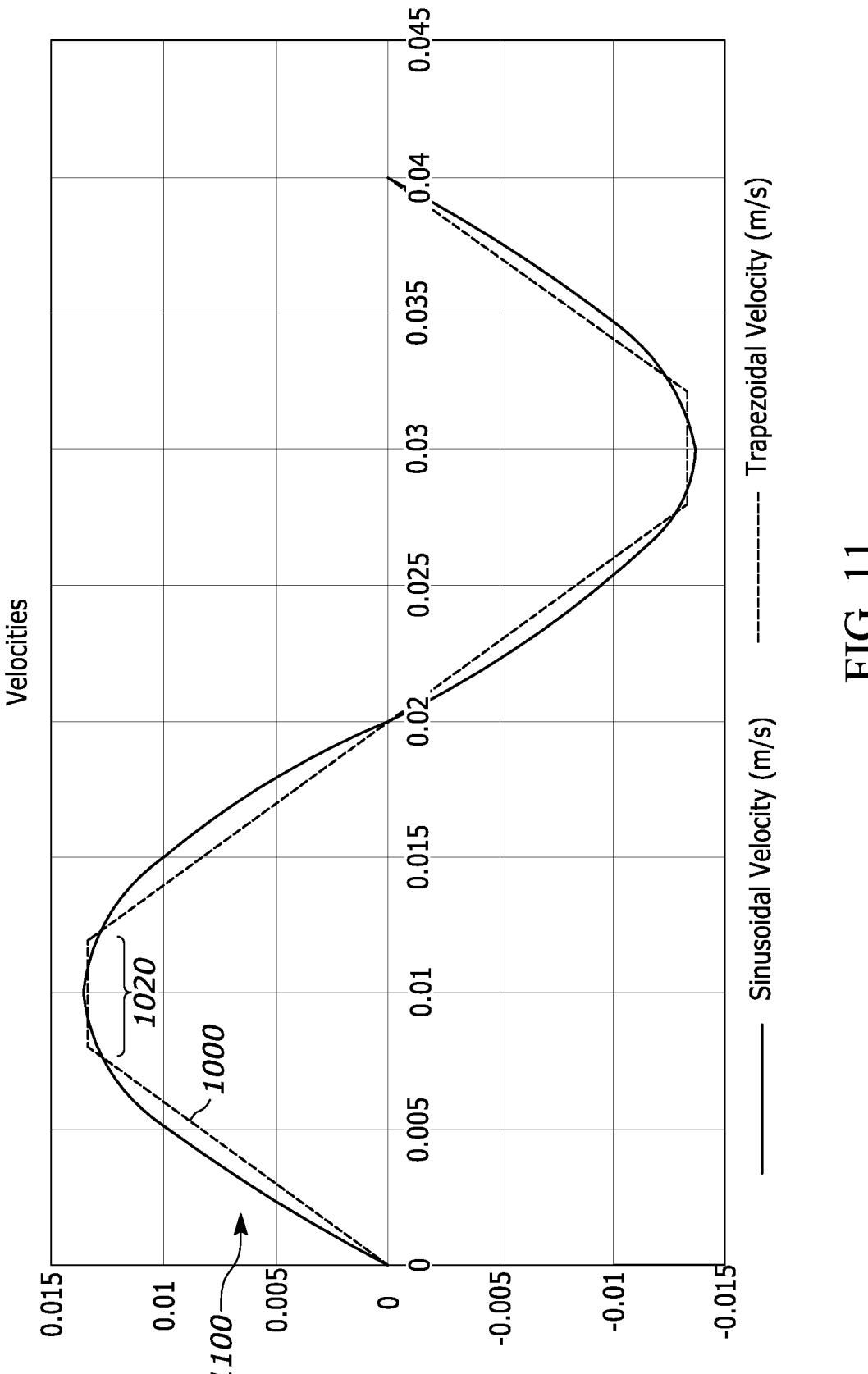
FIG. 11 shows a graph of an image sensor velocity pattern in accordance with various embodiments of these teachings.
Figure 12:
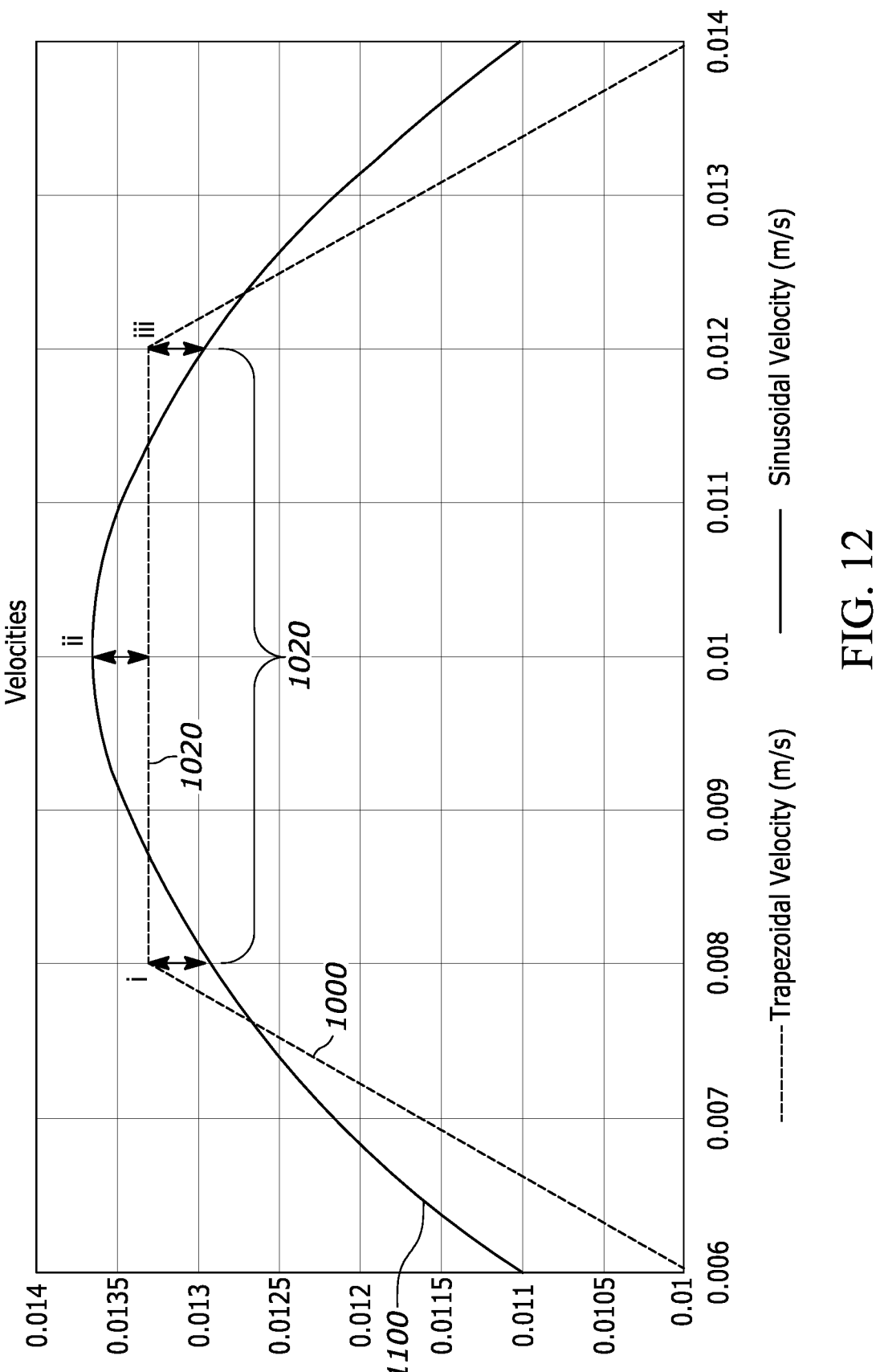
FIG. 12 shows a graph of an image sensor velocity pattern in accordance with various embodiments of these teachings.

With reference now to FIGS. 10-12, various patterns for the controlled movement induced by the actuator 124 will be discussed in more detail. In particular, the velocity patterns shown in FIGS. 10-12 show the velocity of the camera 106 (FIG. 1) under the controlled movement on the y-axis over time on the x-axis. As shown in FIG. 10, the controlled movement can include a linear velocity pattern 1000 that includes an initiation period 1010 where the actuator 124 accelerates the image sensor 112 to a steady state velocity that matches or approximates the operating velocity of the target element 120 (e.g., the linear velocity 306 of FIGS. 3 and 4). The steady state velocity can include the linear velocity 308, the angular velocity 400, or other hybrid variations as described herein. Furthermore, the steady state velocity can include a maximum velocity of the image sensor 112 and, in some embodiments, is within a range from about 20% to about 1% of the operating velocity of the target element 120.

Following the initiation period 1010, the linear velocity pattern 1000 includes a steady state period 1020 where the actuator 124 holds the image sensor 112 at the steady state velocity. The steady state period 1020 is configured to be longer than the designated exposure time for the image sensor 112 and, in some embodiments, is in a range of about 1 ms to about 166 ms. In some embodiments, the controller 116 sets the activation time for the image sensor 112 to occur during the steady state period 1020 such that the designated exposure time expires before an end of the steady state period 1020.

Following the steady state period 1020, the linear velocity pattern 1000 includes a deceleration period 1030 where the actuator 124 decelerates the image sensor 112 away from the steady state velocity back towards a velocity of zero. Following the deceleration period 1030, the linear velocity pattern 1000 includes a reset period 1035 where the actuator 124 returns the image sensor 112 to its initial position. In some embodiments, the reset period 1035 can include equal magnitude and opposite direction inverses of the deceleration period 1030, the steady state period 1020, and the initiation period 1010 to return the image sensor to the initial position. For example, as shown in FIG. 10, these remaining portions can include an inverse initiation period 1040, and inverse steady state period 1050, and an inverse deceleration period 1060. However, it will be appreciated that other faster and slower configurations for the reset period 1035 are possible. For example, the reset period 1035 can be faster than the combined time for the initiation period 1010, steady state period 1020, and deceleration period 1030 to enable longer possible values for the exposure time and steady state period 1020 relative to a constant periodic rate of revolution for the target element 120.

Following the reset period 1035, the linear velocity pattern 1000 can repeat in a periodic manner to match a periodic nature of the movement of the target element 120. In some embodiments, the periodic cycle of the linear velocity pattern 1000 is aligned with a repeating frame rate of the camera 106 or vice versa to ensure that the target element 120 is captured by the image sensor 112. In some embodiments, a repetition rate for the periodic embodiments of the linear velocity pattern 1000 is in a range of about 1 cycle per second to about 100 cycles per second. However, in some embodiments, the repetition rate is in a range of 3 cycles per second to about 25 cycles per second. In these embodiments, the portions of the linear velocity pattern 1000 before the reset period 1035 can last between about 0.02 seconds (20 ms) and about 0.166 seconds (166 ms). In embodiments where the repetition rate is 100 cycles per second, the portions of the linear velocity pattern 1000 before the reset period 1035 can last about 0.005 seconds (5 ms). Furthermore, for a repetition rate of 15 cycles per second, the portions of the linear velocity pattern 1000 before the reset period 1035 can last 0.033 seconds (33 ms).

The travel distance of the image sensor 112 during the linear velocity pattern 1000 is defined in terms of straight-line motion in Equations 4-7 below (e.g., using linear measurements of the flat representation shown in FIG. 3). However, it will be clear to a person of ordinary skill in the art that the equations 4-7 may easily be converted to cylindrical (angular) units as needed. Equation 4 defines a distance $s_1$ in which the image sensor 112 travels during the initiation period 1010, Equation 5 defines the target steady state velocity, Equation 6 defines a distance $s_2$ that the image sensor 112 travels during the steady state period 1020, and Equation 7 defines a distance $s_3$ the image sensor 112 travels during the deceleration period 1030. For Equations 4-7, u equals an initial velocity of the image sensor 112 (e.g. 0), $t_1$ equals a time duration of initiation period 1010, $a_1$ equals the acceleration during the initiation period 1010, $t_2$ equals a time duration of the steady state period 1020, $t_3$ equals a time duration of the deceleration period 1030, and $a_3$ equals the deceleration during the deceleration period 1030.

$$s_1 = ut_1 + \frac{a_1 t_1^2}{2} \qquad \text{Equation 4}$$

$$v = u + at \qquad \text{Equation 5}$$

$$s_2 = vt_2 \qquad \text{Equation 6}$$

$$s_3 = ut_3 + \frac{a_3 t_3^2}{2} \qquad \text{Equation 7}$$

For purposes of the generally linear movement of the image sensor 112 described above with respect to FIG. 3, the total of the distances $s_1$, $s_2$, and $s_3$ are constrained by the clearance amount C defined by the difference between first diameter 310 and the second diameter 312 (e.g., $s_1+s_2+s_3 \le c$). Additionally, the time $t_2$ is constrained to be greater than or equal to the exposure time $t_e$ for the image sensor 112. Other practical constraints can also apply, such as values of the acceleration, velocity, and deceleration need to be within the tolerances of stiffness for the borescope unit 104 and achievable with available embodiment for the actuator 124. There may also be an additional considerations for control system settling times and/or control of jerk (the first derivative of acceleration) to provide for a smooth motion.

In the particular example shown in FIG. 10, the initiation period 1010 and the deceleration period 1030 are equal and opposite and a single period of the linear velocity pattern 1000 is completed in 0.04 seconds to accommodate a frame rate of 25 and an exposure time of 0.004 seconds or lower. Under these conditions the times $t_1$ and $t_3$ are set equal to 0.04–(2×0.004)/4 seconds (i.e. 0.008 seconds). Furthermore, using equations 4 and 6 above $v_1$, $a_1$, and $s_1$ are calculated as below.

$$v_1 = u + a_1 t_1 = 0.0133 = 0 + a_1 \times 0.008,$$

$$\text{where}$$

$$a_1 = \frac{0.0133}{0.008} = 1.66 \text{ m/s}^2$$

$$s_1 = ut_1 + \frac{a_1 t_1^2}{2} = 0 + \frac{1.66 \times 0.008^2}{2} = 0.00005312 \text{ m}$$

Thus, for this specific example, the distance travelled during equal and opposite acceleration and deceleration cycles is 0.053 mm, which means the total motion for the image sensor 112 and/or the camera 106 is contained in a space of about 0.0532+2×0.053=0.16 mm. When a higher frame rate or a shorter exposure time is used, the rate of reciprocation may be increased from 25 cycles per second to 50 or 100 cycles per second. In turn, this would enable the engine to be turned at a higher rate and reduce the time taken to complete an inspection.

In some embodiments, the linear velocity pattern 1000 is substituted for a suitable approximation such as a sinusoidal or equivalent pattern. This substitution can reduce complexity and cost of the actuator 124. An example curved velocity pattern 1100 is shown FIGS. 11 and 12 superimposed over the linear velocity pattern 1000. The curved velocity pattern 1100 or an equivalent thereof are especially useful in combination with the crank and rocker, cam and cam follower, and four-bar linkage embodiments of the actuator 124 described with respect to FIGS. 6-8.

As shown in FIG. 11, the curved velocity pattern 1100 is fitted to minimize the difference with respect to the linear velocity pattern 1000 during steady state period 1020 in which the exposure time for the image sensor 112 will occur. As shown in FIG. 12, the maximum mismatch or difference in magnitude between the target magnitude for the steady state velocity of the linear velocity pattern 1000 of 0.0133 m/s during the steady state period 1020 at points i, ii and iii in the figure above, is 0.000334 m/s, or about 2.5% of the target steady state velocity. This period of minimal overlap can constitute an imaging period or a positive peak period of the curved velocity pattern 1100 in which the controller 116 sets the activation time to occur such that the designated exposure time for the image sensor 112 expires before an end of the positive peak period (e.g., the imaging period has a first time length that is greater than the designated exposure time). Like the linear velocity pattern 1000, the curved velocity pattern 1100 can be periodic to align with a periodic motion of the target element 120. In particular, the curved velocity pattern 1100 can in some embodiments include a continuous periodic velocity pattern.

Figure 13:
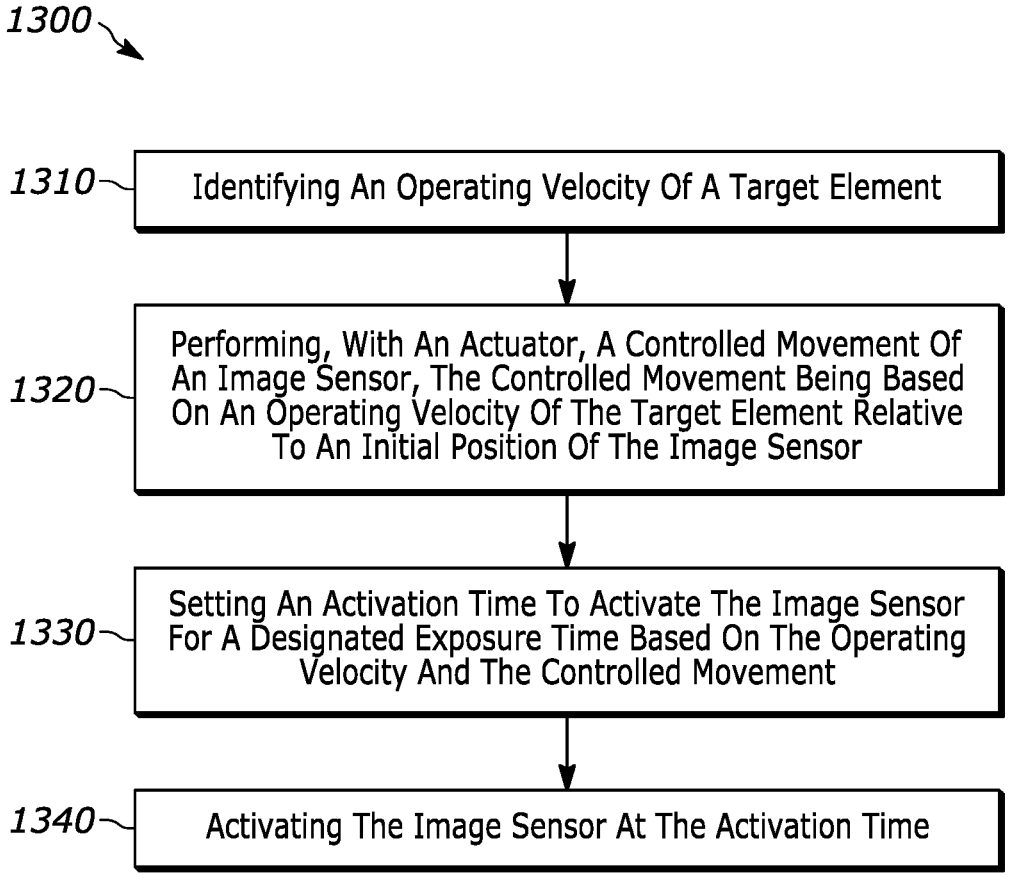
FIG. 13 shows a flow chart of a method pattern in accordance with various embodiments of these teachings.

A method 1300 for inspecting a part or the system 102 with a part inspection imaging system such as the inspection system 100 is shown in FIG. 13. In some embodiments, the method may be performed in whole or in part by the controller 116. The method 1300 includes identifying the operating velocity of a target element 120, as in 1310. Then, the method 1300 includes performing, with the actuator 124, the controlled movement of the image sensor 112, as in 1320. As described herein, the controlled movement is based on the operating velocity of the target element 120 relative to an initial position of the image sensor 112. Next, the method 1300 includes setting an activation time to activate the image sensor 112 for the designated exposure time based on the operating velocity and the controlled movement, as in 1330. Then, the method 1300 includes activating the image sensor 112 at the activation time, as in 1340.

Further aspects of the disclosure are provided by the subject matter of the following clauses:

A part inspection imaging system comprising: an image sensor; an actuator configured to cause a controlled movement of the image sensor relative to a target element, the controlled movement being based on an operating velocity of the target element relative to an initial position of the image sensor; and a controller communicatively coupled to the image sensor, the controller configured to: identify the operating velocity; determine an activation time to activate the image sensor for a designated exposure time based on the operating velocity and the controlled movement; and activate the image sensor at the activation time.

The system of any preceding clause wherein the image sensor is located at a distal end of a borescope unit, wherein the distal end of the borescope unit is inserted through a port along a tool axis into an interior region that contains the target element.

The system of any preceding clause wherein a total travel distance of the image sensor from the initial position during the controlled movement is less than or equal to a clearance distance.

The system of any preceding clause wherein the clearance distance is a distance between an exterior of the borescope unit and an interior of the port when the image sensor is at the initial position.

The system of any preceding clause wherein the clearance distance is in a range from about 0.1 mm to about 4 mm.

The system of any preceding clause wherein the clearance distance is a distance between the distal end of the borescope unit and other elements present within the interior region.

The system of any preceding clause wherein the borescope unit comprises elongate portions angled with respect to each other, the elongate portions including a first portion that passes through the port and a second portion disposed perpendicular to the first portion within the interior region, and wherein the image sensor is disposed on the second portion.

The system of any preceding clause wherein the actuator linearly translates the borescope unit perpendicular to the tool axis to perform the controlled movement.

The system of any preceding clause wherein the actuator rotates the borescope unit around the tool axis to perform the controlled movement.

The system of any preceding clause wherein the actuator pivots the borescope unit around a pivot axis to perform the controlled movement, wherein the pivot axis is located at a point outside the interior region and is disposed perpendicular to a tool axis of the borescope unit at the point outside the interior region.

The system of any preceding clause wherein the actuator includes at least one of a linear actuator, a voice coil, a torque motor, a crank and rocker, a cam and cam follower, or a four-bar linkage.

The system of any preceding clause wherein the controller is configured to activate the actuator to perform the controlled movement of the image sensor relative to the target element.

The system of any preceding clause further comprising a turning tool configured to rotate the target element at the operating velocity.

The system of any preceding clause further comprising a second controller configured to activate the turning tool and the actuator.

The system of any preceding clause wherein the actuator is linked to the turning tool such that rotation of the target element at the operating velocity induces the controlled movement.

The system of any preceding clause wherein the controlled movement includes an initiation period where the actuator accelerates the image sensor to a steady state velocity that matches the operating velocity, a steady state period where the actuator holds the image sensor at the steady state velocity, and a deceleration period where the actuator decelerates the image sensor away from the steady state velocity.

The system of any preceding clause wherein the steady state velocity is an angular velocity around a tool axis through which the image sensor is inserted into an interior region that contains the target element, wherein the angular velocity matches the operating velocity when a center point of a camera lens associated with the image sensor has a velocity that approximately matches the velocity of a key point on the target element that is moving at the operating velocity.

The system of any preceding clause wherein the controlled movement includes a reset period where the actuator returns the image sensor to the initial position.

The system of any preceding clause wherein the reset period includes equal magnitude and opposite direction inverses of the deceleration period, the steady state period, and the initiation period to return the image sensor to the initial position.

The system of any preceding clause wherein the steady state period is longer than the designated exposure time, and wherein the controller sets the activation time to occur during the steady state period such that the designated exposure time expires before an end of the steady state period.

The system of any preceding clause wherein the controlled movement includes a continuous periodic velocity pattern for the image sensor, wherein the continuous periodic velocity pattern includes a positive peak period that includes a maximum velocity of the image sensor for the continuous periodic velocity pattern that is within a range of about 20% to about 1% of the operating velocity, and wherein the controller sets the activation time to occur during the positive peak period such that the designated exposure time expires before an end of the positive peak period.

The system of any preceding clause further comprising a movement guide coupled to a borescope unit that includes the image sensor, wherein the movement guide is configured to induce the controlled movement of the image sensor to follow a preconfigured path.

The system of any preceding clause wherein the preconfigured path includes a curved path of the target element with respect to a rotational axis, and wherein the movement guide includes at least one of a curved guideway or a ball slide.

The system of any preceding clause wherein the preconfigured path includes a linear path perpendicular to a tool axis through which the image sensor is inserted into an interior region that contains the target element, and wherein the movement guide includes linear slide or guide.

The system of any preceding clause further comprising an additional sensor configured to transmit a detection signal to the controller when the additional sensor detects movement within a sensing region of the additional sensor, wherein the controller determines the operating velocity based on the detection signal.

The system of any preceding clause wherein the sensor is one of a switch, an inductive proximity sensor, an optical proximity sensor, a hall effect sensor, an electrical continuity sensor, or an ultrasonic sensor.

The system of any preceding clause wherein the controller determines the operating velocity using a received user input.

The system of any preceding clause wherein the received user input includes a known frequency and duration of a repeating and periodic movement of the target element relative to the image sensor.

The system of any preceding clause wherein the activation time comprises a time delay from receipt of the detection signal based on a known value of the operating velocity.

The system of any preceding clause wherein the controller identifies the operating velocity from an average revolutions per minute of the target element, the average revolutions of the target element determined by the controller from repeated receptions of the detection signal, and wherein the activation time comprises a time delay from receipt of the detection signal based on the average revolutions per minute of the target element.

The system of any preceding clause wherein the controlled movement includes an imaging period where a maximum velocity of the image sensor is within a range of at least about 20% to about 1% of the operating velocity and a reset period, the imaging period having a first time length that is greater than the designated exposure time.

The system of any preceding clause wherein the first time length is in a range of about 20 ms to about 166 ms.

The system of any preceding clause wherein the reset period has a second time length that is equal to the first time length.

The system of any preceding clause wherein the reset period has a second time length that is greater than the first time length.

The system of any preceding clause wherein the reset period has a second time length that is less than the first time length.

The system of any preceding clause wherein the controller is further configured to identify a repeating frame rate as the activation time, and wherein the controlled movement includes a periodic cycle that is aligned with the repeating frame rate.

The system of any preceding clause wherein the periodic cycle repeats at a rate in a range of about 1 cycle per second to about 100 cycles per second.

The system of any preceding clause wherein the designated exposure time is in a range from about 1 ms to about 4 ms.

The system of any preceding clause wherein the operating velocity is in a range of about 1 mm/s to about 50 mm/s.

A method for inspecting a part with a imaging system, the method comprising: identifying an operating velocity of a target element; performing, with an actuator, a controlled movement of an image sensor, the controlled movement being based on an operating velocity of the target element relative to an initial position of the image sensor; setting an activation time to activate the image sensor for a designated exposure time based on the operating velocity and the controlled movement; and activating the image sensor at the activation time.

The method of any preceding clause further comprising: identifying an imaging period of the controlled movement for which a maximum velocity of the image sensor is within a range from about 20% to about 1% of the operating velocity and which has a time length that is greater than the designated exposure time; and setting the activation time to occur within the imaging period such that the designated exposure time expires before an end of the imaging period.

What is claimed is:

1. A part inspection imaging system comprising:
an image sensor;
an actuator configured to cause a controlled movement of the image sensor relative to a target element, the controlled movement being based on an operating velocity of the target element relative to an initial position of the image sensor; and
a controller communicatively coupled to the image sensor, the controller configured to:
identify the operating velocity;
determine an activation time to activate the image sensor for a designated exposure time based on the operating velocity and the controlled movement; and
activate the image sensor at the activation time, wherein the controlled movement includes an imaging period where a maximum velocity of the image sensor is within a range of at least about 20% to about 1% of the operating velocity and a reset period, the imaging period having a first time length that is greater than the designated exposure time.

2. The system of claim 1 wherein the image sensor is located at a distal end of a borescope unit, wherein the distal end of the borescope unit is inserted through a port along a tool axis into an interior region that contains the target element.

3. The system of claim 2 wherein the actuator linearly translates the borescope unit perpendicular to the tool axis to perform the controlled movement.

4. The system of claim 2 wherein the actuator pivots the borescope unit around a pivot axis to perform the controlled movement, wherein the pivot axis is located at a point outside the interior region and is disposed perpendicular to a tool axis of the borescope unit at the point outside the interior region.

5. The system of claim 1 wherein the actuator includes at least one of a linear actuator, a voice coil, a torque motor, a crank and rocker, a cam and cam follower, or a four-bar linkage.

6. The system of claim 1 wherein the controller is configured to activate the actuator to perform the controlled movement of the image sensor relative to the target element.

7. The system of claim 1 wherein the controlled movement includes an initiation period where the actuator accelerates the image sensor to a steady state velocity that matches the operating velocity, a steady state period where the actuator holds the image sensor at the steady state velocity, and a deceleration period where the actuator decelerates the image sensor away from the steady state velocity.

8. A part inspection imaging system comprising:
an image sensor;
an actuator configured to cause a controlled movement of the image sensor relative to a target element, the controlled movement being based on an operating velocity of the target element relative to an initial position of the image sensor; and a controller communicatively coupled to the image sensor, the controller configured to:

identify the operating velocity;

determine an activation time to activate the image sensor for a designated exposure time based on the operating velocity and the controlled movement; and activate the image sensor at the activation time, wherein the controlled movement includes an initiation period where the actuator accelerates the image sensor to a steady state velocity that approximately matches the operating velocity, a steady state period where the actuator holds the image sensor at the steady state velocity, and a deceleration period where the actuator decelerates the image sensor away from the steady state velocity, wherein the steady state velocity is an angular velocity around a tool axis through which the image sensor is inserted into an interior region that contains the target element, wherein the angular velocity approximately matches the operating velocity when a center point of a camera lens associated with the image sensor has a velocity that approximately matches the velocity of a key point on the target element that is moving at the operating velocity.

9. A part inspection imaging system comprising:

an image sensor;

an actuator configured to cause a controlled movement of the image sensor relative to a target element, the controlled movement being based on an operating velocity of the target element relative to an initial position of the image sensor; and a controller communicatively coupled to the image sensor, the controller configured to:

identify the operating velocity;

determine an activation time to activate the image sensor for a designated exposure time based on the operating velocity and the controlled movement; and activate the image sensor at the activation time, wherein the controlled movement includes an initiation period where the actuator accelerates the image sensor to a steady state velocity that approximately matches the operating velocity, a steady state period where the actuator holds the image sensor at the steady state velocity, and a deceleration period where the actuator decelerates the image sensor away from the steady state velocity, wherein the controlled movement includes a reset period where the actuator returns the image sensor to the initial position.

10. The system of claim 9 wherein the reset period includes equal magnitude and opposite direction inverses of the deceleration period, the steady state period, and the initiation period to return the image sensor to the initial position.

11. A part inspection imaging system comprising:

an image sensor;

an actuator configured to cause a controlled movement of the image sensor relative to a target element, the controlled movement being based on an operating velocity of the target element relative to an initial position of the image sensor; and a controller communicatively coupled to the image sensor, the controller configured to:

identify the operating velocity;

determine an activation time to activate the image sensor for a designated exposure time based on the operating velocity and the controlled movement; and activate the image sensor at the activation time, wherein the controlled movement includes an initiation period where the actuator accelerates the image sensor to a steady state velocity that approximately matches the operating velocity, a steady state period where the actuator holds the image sensor at the steady state velocity, and a deceleration period where the actuator decelerates the image sensor away from the steady state velocity, wherein the steady state period is longer than the designated exposure time, and wherein the controller sets the activation time to occur during the steady state period such that the designated exposure time expires before an end of the steady state period.

12. A part inspection imaging system comprising:

an image sensor;

an actuator configured to cause a controlled movement of the image sensor relative to a target element, the controlled movement being based on an operating velocity of the target element relative to an initial position of the image sensor; and a controller communicatively coupled to the image sensor, the controller configured to:

identify the operating velocity:

determine an activation time to activate the image sensor for a designated exposure time based on the operating velocity and the controlled movement; and activate the image sensor at the activation time, wherein the controlled movement includes a continuous periodic velocity pattern for the image sensor, wherein the continuous periodic velocity pattern includes a positive peak period that includes a maximum velocity of the image sensor for the continuous periodic velocity pattern that is within a range of about 20% to about 1% of the operating velocity, and wherein the controller sets the activation time to occur during the positive peak period such that the designated exposure time expires before an end of the positive peak period.

13. The system of claim 1 further comprising a movement guide coupled to a borescope unit that includes the image sensor, wherein the movement guide is configured to induce the controlled movement of the image sensor to follow a preconfigured path.

14. A part inspection imaging system comprising:

an image sensor;

an actuator configured to cause a controlled movement of the image sensor relative to a target element, the controlled movement being based on an operating velocity of the target element relative to an initial position of the image sensor;

a controller communicatively coupled to the image sensor, the controller configured to:

identify the operating velocity;

determine an activation time to activate the image sensor for a designated exposure time based on the operating velocity and the controlled movement; and activate the image sensor at the activation time; and a movement guide coupled to a borescope unit that includes the image sensor, wherein the movement guide is configured to induce the controlled movement of the image sensor to follow a preconfigured path, wherein the preconfigured path includes a curved path of the target element with respect to a rotational axis, and wherein the movement guide includes at least one of a curved guideway or a ball slide.

15. A part inspection imaging system comprising:

an image sensor;

an actuator configured to cause a controlled movement of the image sensor relative to a target element, the controlled movement being based on an operating velocity of the target element relative to an initial position of the image sensor; and a controller communicatively coupled to the image sensor, the controller configured to:

identify the operating velocity:

determine an activation time to activate the image sensor for a designated exposure time based on the operating velocity and the controlled movement; and activate the image sensor at the activation time; and a movement guide coupled to a borescope unit that includes the image sensor, wherein the movement guide is configured to induce the controlled movement of the image sensor to follow a preconfigured path, wherein the preconfigured path includes a linear path perpendicular to a tool axis through which the image sensor is inserted into an interior region that contains the target element, and wherein the movement guide includes a linear slide or guide.

16. The system of claim 1 further comprising an additional sensor configured to transmit a detection signal to the controller when the additional sensor detects movement within a sensing region of the additional sensor, wherein the controller determines the operating velocity based on the detection signal.

17. The system of claim 1 wherein the controller determines the operating velocity using a received user input.

18. A method for inspecting a part with an imaging system, the method comprising:

identifying an operating velocity of a target element;

performing, with an actuator, a controlled movement of an image sensor, the controlled movement being based on the operating velocity of the target element relative to an initial position of the image sensor;

identifying an imaging period of the controlled movement for which a maximum velocity of the image sensor is within a range from about 20% to about 1% of the operating velocity and which has a time length that is greater than the designated exposure time;

setting an activation time to activate the image sensor for a designated exposure time based on the operating velocity and the controlled movement and setting the activation time to occur within the imaging period such that the designated exposure time expires before an end of the imaging period; and activating the image sensor at the activation time.

* * * * *